United States Patent
Schraff et al.

(10) Patent No.: US 10,906,122 B2
(45) Date of Patent: Feb. 2, 2021

(54) PORTABLE DRAWN ARC STUD WELDER INCLUDING A LITHIUM FERROPHOSPHATE BATTERY

(71) Applicant: Nelson Stud Welding, Inc., Elyria, OH (US)

(72) Inventors: Scott J. Schraff, Avon, OH (US); Jeffrey Krupp, Vermillion, OH (US); Stephen D. Brooks, Valley City, OH (US)

(73) Assignee: NELSON STUD WELDING, INC., Elyria, OH (US)

( * ) Notice: Subject to any disclaimer, the term of this patent is extended or adjusted under 35 U.S.C. 154(b) by 460 days.

(21) Appl. No.: 15/924,949

(22) Filed: Mar. 19, 2018

(65) Prior Publication Data

US 2018/0264581 A1   Sep. 20, 2018

Related U.S. Application Data

(60) Provisional application No. 62/472,762, filed on Mar. 17, 2017.

(51) Int. Cl.
*B23K 9/20*   (2006.01)
*B23K 9/095*  (2006.01)
(Continued)

(52) U.S. Cl.
CPC ............ *B23K 9/205* (2013.01); *B23K 9/0953* (2013.01); *B23K 9/1006* (2013.01);
(Continued)

(58) Field of Classification Search
CPC ............................ B23K 9/0953; B23K 9/1006
(Continued)

(56) References Cited

U.S. PATENT DOCUMENTS

2008/0053967 A1* 3/2008 Moore ................... B23K 9/205
                                                 219/98
2008/0210676 A1* 9/2008 Lambirth ............... B23K 9/133
                                                 219/130.1
(Continued)

FOREIGN PATENT DOCUMENTS

EP          03940742      10/1990
RU          2607508 C1     1/2017
(Continued)

OTHER PUBLICATIONS

Secondary (Rechargeable) Batteries—Battery University; BU-107: Comparison Table of Secondary Batteries; downloaded from the internet Mar. 18, 2018; 10 pages.

(Continued)

*Primary Examiner* — Tu B Hoang
*Assistant Examiner* — Thomas J Ward
(74) *Attorney, Agent, or Firm* — Dickinson Wright PLLC

(57) ABSTRACT

A portable drawn arc stud welder apparatus with a lithium ferrophosphate (LFP) battery and stud weld battery control system (SWBCS) is provided for welding a stud onto a workpiece. The portable drawn arc stud welder apparatus includes a housing, an LFP battery disposed in the housing and including a plurality of LFP battery cells, a weld stud gun configured to hold a stud and is electrically connected to the LFP battery for receiving energy from the LFP battery to pass a current through the stud and the workpiece to form a weldment. The SWBCS is disposed in the housing and electrically connected to the LFP battery of the portable drawn arc stud welder apparatus. The SWBCS includes a computer, a memory, and instructions therein to implement control and monitoring of the operation of the portable drawn arc stud welder apparatus.

19 Claims, 15 Drawing Sheets

(51) Int. Cl.
*B23K 9/10* (2006.01)
*H04W 52/02* (2009.01)

(52) U.S. Cl.
CPC ............ *B23K 9/1043* (2013.01); *B23K 9/202* (2013.01); *B23K 9/207* (2013.01); *H04W 52/0261* (2013.01)

(58) Field of Classification Search
USPC .................................. 219/98, 130.1, 130.21
See application file for complete search history.

(56) References Cited

U.S. PATENT DOCUMENTS

| | | |
|---|---|---|
| 2013/0062327 A1 | 3/2013 | Hsu et al. |
| 2013/0112367 A1* | 5/2013 | Kooken ............... B23K 9/1006 165/11.1 |
| 2013/0126498 A1 | 5/2013 | Hsu et al. |
| 2015/0076121 A1 | 3/2015 | Krupp et al. |
| 2015/0314387 A1 | 11/2015 | Starzengruber et al. |
| 2017/0021440 A1 | 1/2017 | Balaster |
| 2017/0050259 A1 | 2/2017 | Schraff et al. |
| 2017/0104350 A1* | 4/2017 | Luerkens ............ H01M 10/482 |

FOREIGN PATENT DOCUMENTS

| | | |
|---|---|---|
| WO | 2008027947 A2 | 3/2008 |
| WO | 2008118958 A1 | 10/2008 |

OTHER PUBLICATIONS

International Search Report; PCT/US2018/023105; dated Jul. 4, 2018; 5 pages.

* cited by examiner

PORTABLE DRAWN ARC STUD WELDER INCLUDING A LITHIUM FERROPHOSPHATE BATTERY

CROSS REFERENCE TO RELATED APPLICATION

The present application claims priority to U.S. Provisional Patent Application Ser. No. 62/472,762, filed on Mar. 17, 2017, and entitled "DRAWN ARC STUD WELDER INCLUDING AN LFP BATTERY", the disclosure of which is hereby incorporated by reference as though set forth fully herein.

BACKGROUND OF THE DISCLOSURE

The present disclosure relates to a stud welder, and more particularly to a lithium ferrophosphate battery-powered, portable drawn arc stud welder.

Stud welding is a technique for welding a fastener, such as stud or other fastener, to a base metal of a workpiece. It should be understood that the term "stud" is used herein to refer to studs and other fasteners in general, and is only exemplary and not limiting. Various stud welder systems are known in the art for this purpose. One such type of stud welder system is known as a capacitive discharge (CD) system, which may include a charging circuit, an energy storage device (e.g., one or more capacitors), and a discharge circuit which extends through a weld stud gun. The power supply for such welding systems is normally an external source of AC power. In operation, the energy storage device is discharged to create an arc between a stud that is connected to the weld stud gun and the workpiece, thereby heating up the stud and the workpiece. When the arc is complete, the weld stud gun plunges the stud into the heated area on the workpiece to create a weldment. However, these stud welder systems must be tethered to an external power supply (i.e., AC power), during operation, and thus are not portable. Also, the capacitive discharge process that these systems use is recognized in the art, and by key regulatory codes such as the American Welding Society (AWS) D1.1, as being unsuitable for full strength welds required in structural applications.

To produce full strength welds suitable for structural applications, it is known in the art, and required by AWS D1.1 welding code, to apply a drawn arc stud welding system. A drawn arc stud welding system may include a high capacity electrical power converter, which may use a single phase or three phase industrial AC power supply as an input, and may produce a high current DC welding output. For a drawn arc system capable of welding a stud of 1.27 cm (0.5 in) diameter, this DC welding output current should be between 800 to 900 amps, for a duration of 500 to 600 milliseconds.

Drawn arc stud welding systems may be battery powered to achieve true portability, not needing to be connected to an input power cable, and being small and lightweight for easy transport. For these portable battery powered systems, the challenge for an optimally-applied battery is to repeatedly provide the required high weld currents, and a suitably high weld voltage, while being as small and as light as possible.

Drawn arc stud welding systems including a battery should to be able to produce stud welds at a rate (e.g., stud welds per minute), that meets the expectations of experienced welders (i.e., operators/users). This requirement leads to the need for the battery of the drawn arc stud welding system to have excellent thermal management capability and to avoid overheating. The battery needs to be intrinsically safe from commonly-understood hazards, including exothermic runaway events, caused by overheating during use, or impacts/punctures that may cause internal short circuits, leading to overcurrent/overheating of the internal structure of the battery.

Some existing portable battery-powered drawn arc stud welding systems rely on several types of batteries, each of which has its own application tradeoffs. For example, an existing portable battery-powered drawn arc stud welding system may use multiple lead acid batteries, resulting in a relatively large and heavy portable welding system. The use of multiple lead acid batteries, which have a relatively low specific energy (Wh/kg), results in a portable welding system that is difficult to transport and therefore has limitations on its applicability. The existing portable battery-powered drawn arc stud welding system may use four (4) 12 volt DC lead acid batteries that are each permanently disposed with the portable battery powered drawn arc stud welding system housing to provide the high current capacity needed for drawn arc stud welding. The existing portable battery-powered drawn arc stud welding system including lead acid batteries may include an internal battery charger which further increases the size and weight of the resultant portable battery-powered drawn arc stud welding system. As lead acid batteries may require a relatively long recharge period, such a system may suffer from extended periods of lost operational time due to this limitation. Aside from the aforementioned limitations of lead acid batteries, additional limitations include battery degradation due to excessive heat, battery aging, excessive discharge, slow rate of charge, short cycle life, and possible hazardous conditions due to leakage of acid and/or hydrogen gas. In addition, lead is a toxic metal, which creates additional hazards for environmentally appropriate disposal.

Other battery types for portable battery-powered drawn arc stud welding systems have negative attributes that limit their applicability in portable battery-powered drawn arc stud welding systems. Nickel cadmium (NiCd) batteries may lose their charge rapidly when not in use. NiCd batteries may also need to be completely discharged/charged to prevent an effect known as the memory effect, wherein NiCd batteries gradually lose their maximum charge capacity if not fully discharged before recharging. This effect only increases over time. Finally, NiCd batteries contain toxic cadmium which, like lead acid batteries, create additional hazards for environmentally appropriate disposal. (Battery type characteristics information source: http://batteryuniversity.com/learn/article/secondary_batteries).

Nickel metal hydride (NiMH) batteries may lose their charge even more than NiCd batteries when not in use. NiMH batteries also have a shorter cycle life (total number of charge/discharge cycles lifetime) when compared to NiCd batteries. Finally, NiMH batteries require double the recharging time of NiCd batteries.

Other lithium ion battery chemistries, including lithium cobalt oxide ($LiCoO_2$), lithium manganese oxide ($LiMn_2O_4$), and lithium nickel manganese cobalt oxide ($LiNiMnCoO_2$, or "NMC") may be vulnerable to thermal runaway from overcurrent and/or overheating, that could result in fires or other hazardous situations. Finally, cobalt is a toxic metal, like lead and cadmium, creating additional hazards for environmentally appropriate disposal.

In view of the foregoing, there remains a need for a low cost, portable, drawn arc stud welding system.

SUMMARY OF THE DISCLOSURE

The subject disclosure is directed to a portable battery powered drawn arc stud welding system with an LFP battery and a stud weld battery control system provides these benefits. Specifically, a portable drawn arc stud welder apparatus with a lithium ferrophosphate (LFP) battery and stud weld battery control system (SWBCS) is provided for welding a stud onto a workpiece. A portable drawn arc stud welder apparatus includes a housing, an LFP battery disposed in the housing, a plurality of LFP battery cells, a weld stud gun configured to hold a stud and electrically connected to the LFP battery for receiving energy from the LFP battery to pass an electric current through the stud and the workpiece to form a weldment. The SWBCS is disposed in the housing and electrically connected to the LFP battery of the portable drawn arc stud welder apparatus. The SWBCS includes a computer (e.g., digital controller), a memory, and instructions therein to implement control and monitoring of the operation of the portable drawn arc stud welder apparatus, as will be described below.

A portable drawn arc stud welder apparatus with an LFP battery and stud weld battery control system (SWBCS) is provided for welding a stud onto a workpiece. The portable drawn arc stud welder may include a housing, a lithium ferrophosphate (LFP) battery that may disposed in the housing and may include a plurality of LFP battery cells, a weld stud gun configured to hold a stud electrically connected to the LFP battery for receiving energy from the LFP battery to pass an electric current through the stud and the workpiece to form a weldment, a stud weld battery control system (SWBCS) disposed in the housing electrically connected to the LFP battery of the portable drawn arc stud welder apparatus. The SWBCS includes a computer, including a processor and a memory, and instructions therein, to implement control and monitoring of the operation of the portable drawn arc stud welder apparatus. The SWBCS is configured to measure a temperature of the LFP battery via the temperature sensors against a predetermined temperature level. The SWBCS is configured to activate one or more fans disposed in the housing if the measured temperature of the LFP battery exceeds the predetermined temperature level, and/or based on other control variables described herein. The SWBCS is configured to deactivate the one or more fans when the measured temperature drops below the predetermined temperature level, and/or based on other control variables described herein.

The advantages of incorporating an LFP battery in a portable drawn arc stud welder apparatus include at least that the portable drawn arc stud welder apparatus delivers full strength stud welds for structural applications. The portable drawn arc stud welder apparatus meets the requirements of AWS D1.1, in a small, lightweight package that a single user/operator can easily move. The portable drawn arc stud welder apparatus is capable of welding over one hundred (100) 1.27 cm (0.5 in) stud welds without the need to recharge the LFP battery. The portable drawn arc stud welder apparatus incorporating an LFP battery has a number of unique battery performance attributes, including the capability to be trickle (i.e., slow) charged continuously without damage to the LFP battery, the trickle charge rate exceeds the weld discharge rate (i.e., welding will not overtake the trickle charging late to eventually discharge the LFP battery), no battery memory issues necessitating full discharge before recharging, is intrinsically safe from thermal runaway conditions, and creates no toxic or hazardous waste at disposal.

BRIEF DESCRIPTION OF THE DRAWINGS

Other advantages of the present disclosure will be readily appreciated, as the same becomes better understood by reference to the following detailed description when considered in connection with the accompanying drawings wherein.

DESCRIPTION OF THE EMBODIMENTS

Figure 1:
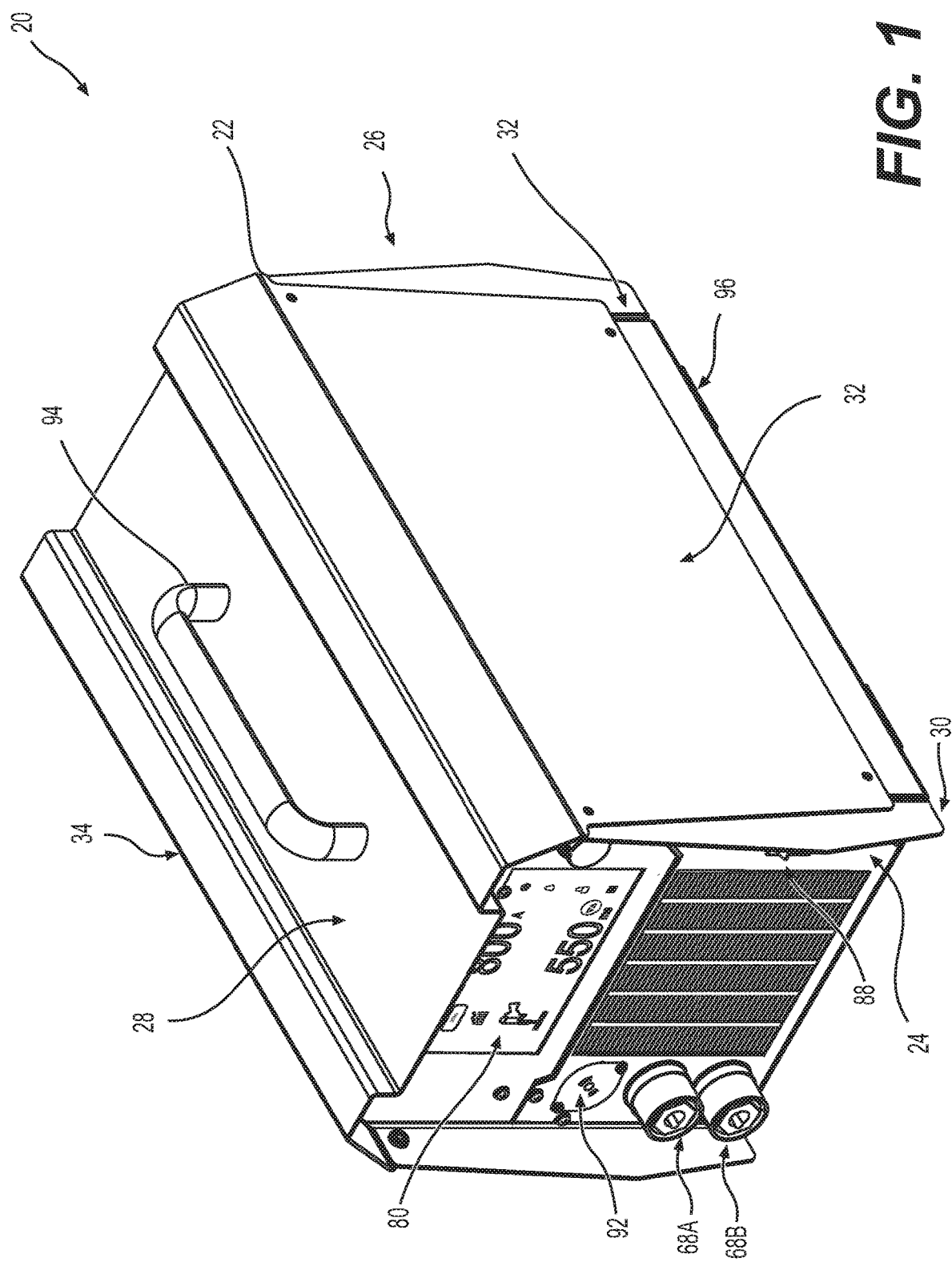
FIG. 1 is a perspective side view of a portable drawn arc stud welder according to an aspect of the disclosure, illustrating at least a housing with a handle for allowing the portable drawn arc stud welder to be easily carried by an operator/user.
Figure 2:
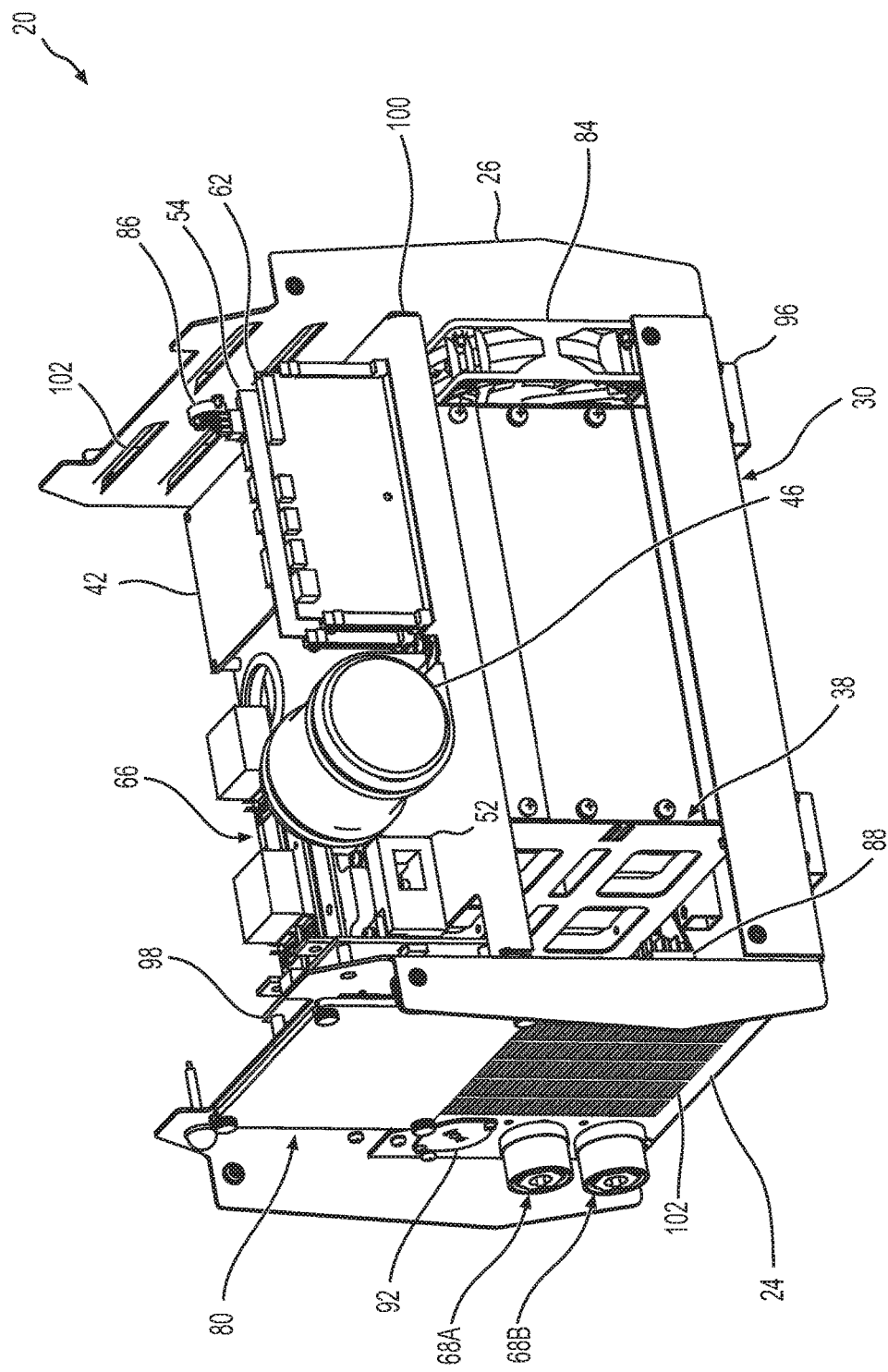
FIG. 2 is a perspective view of a portable drawn arc stud welder with a housing removed according to an aspect of the disclosure, illustrating at least an LFP battery, a gun coil capacitor, a stud welder battery control system (SWBCS) board, a weld stud gun control board, an input control system board, a video display board, and an LCD display.
Figure 3:
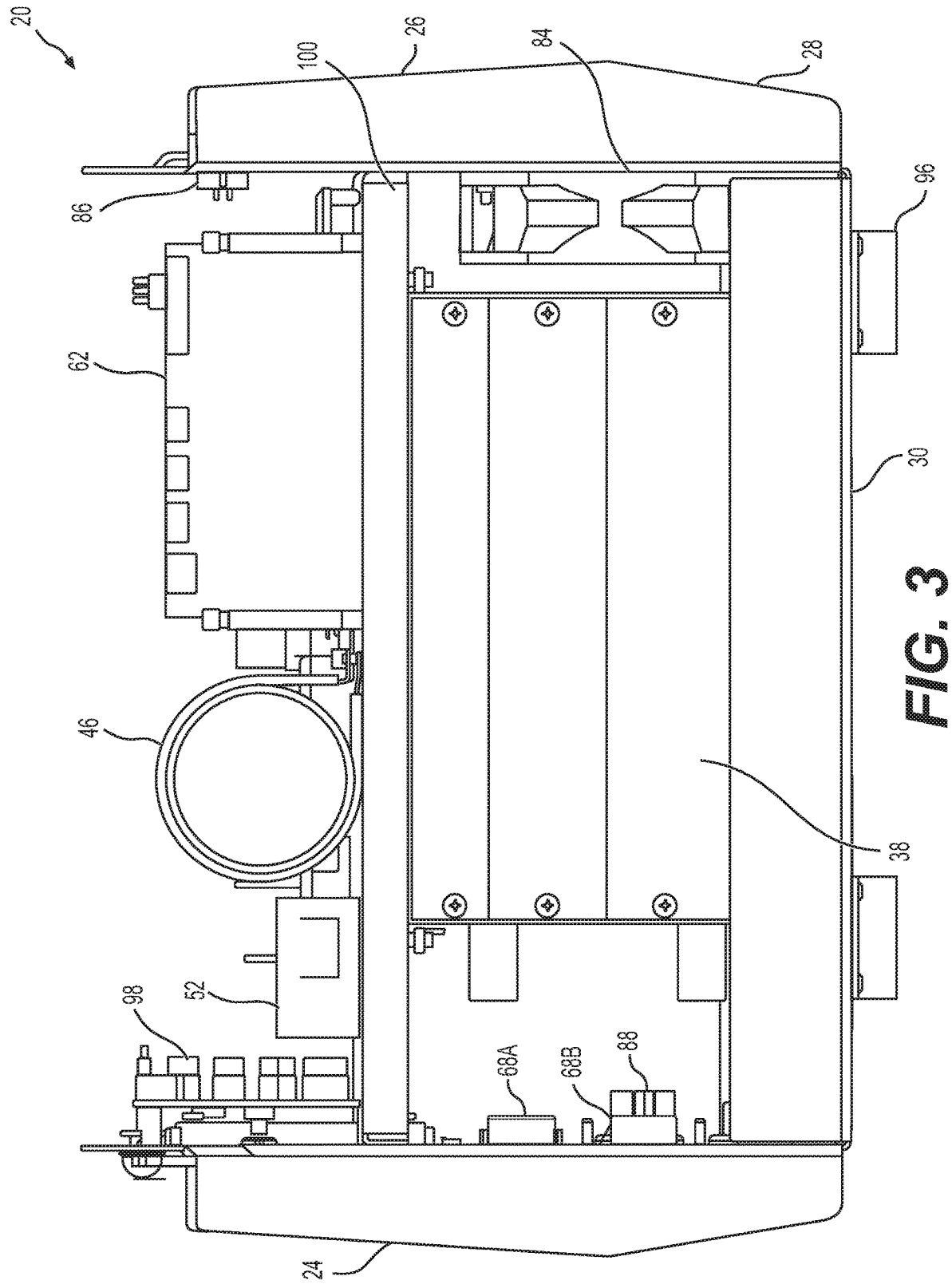
FIG. 3 is a side view of the portable drawn arc stud welder of FIG. 2.
Figure 4:
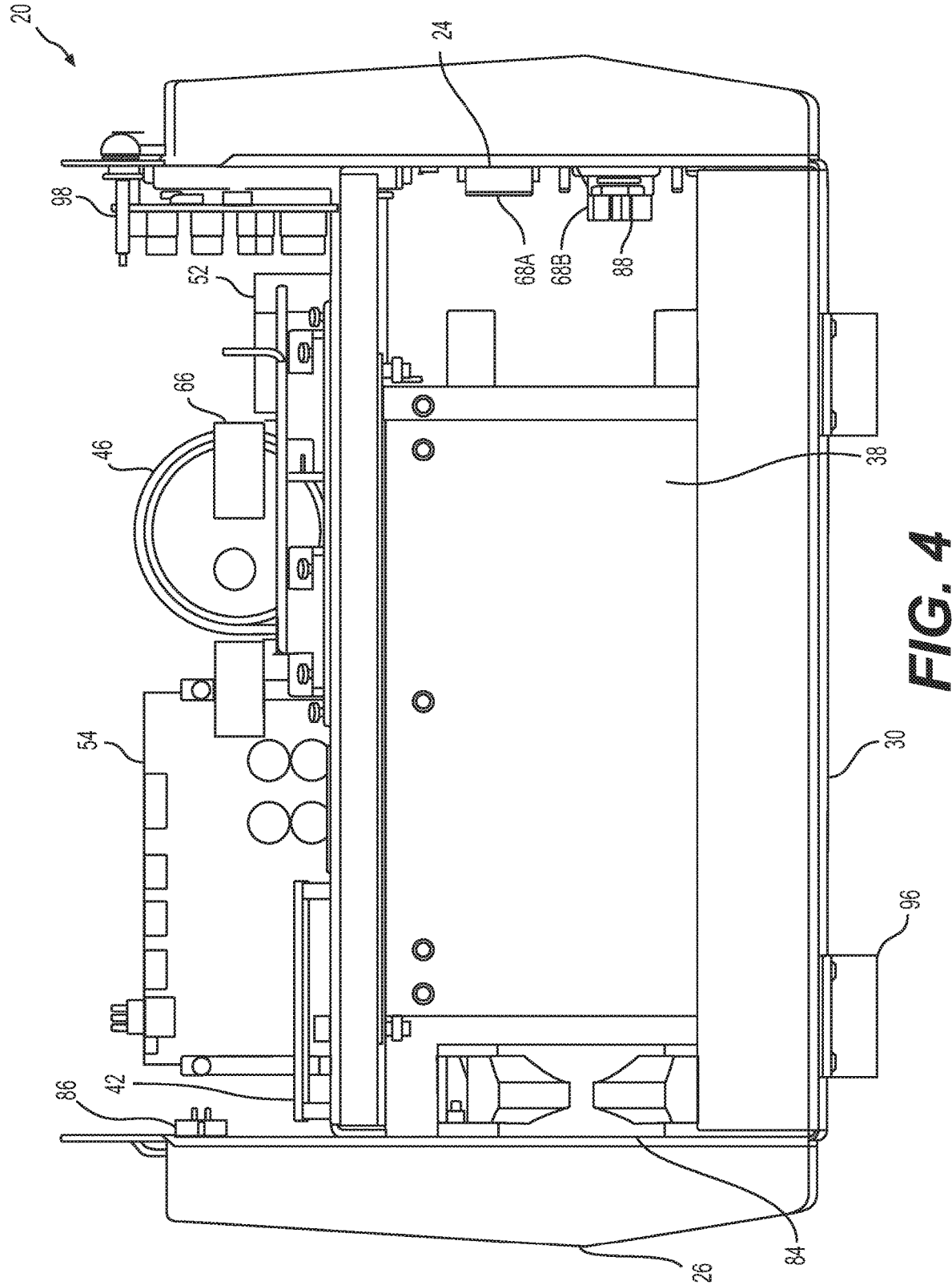
FIG. 4 is the other side view of the portable drawn arc stud welder of FIG. 2.
Figure 5:
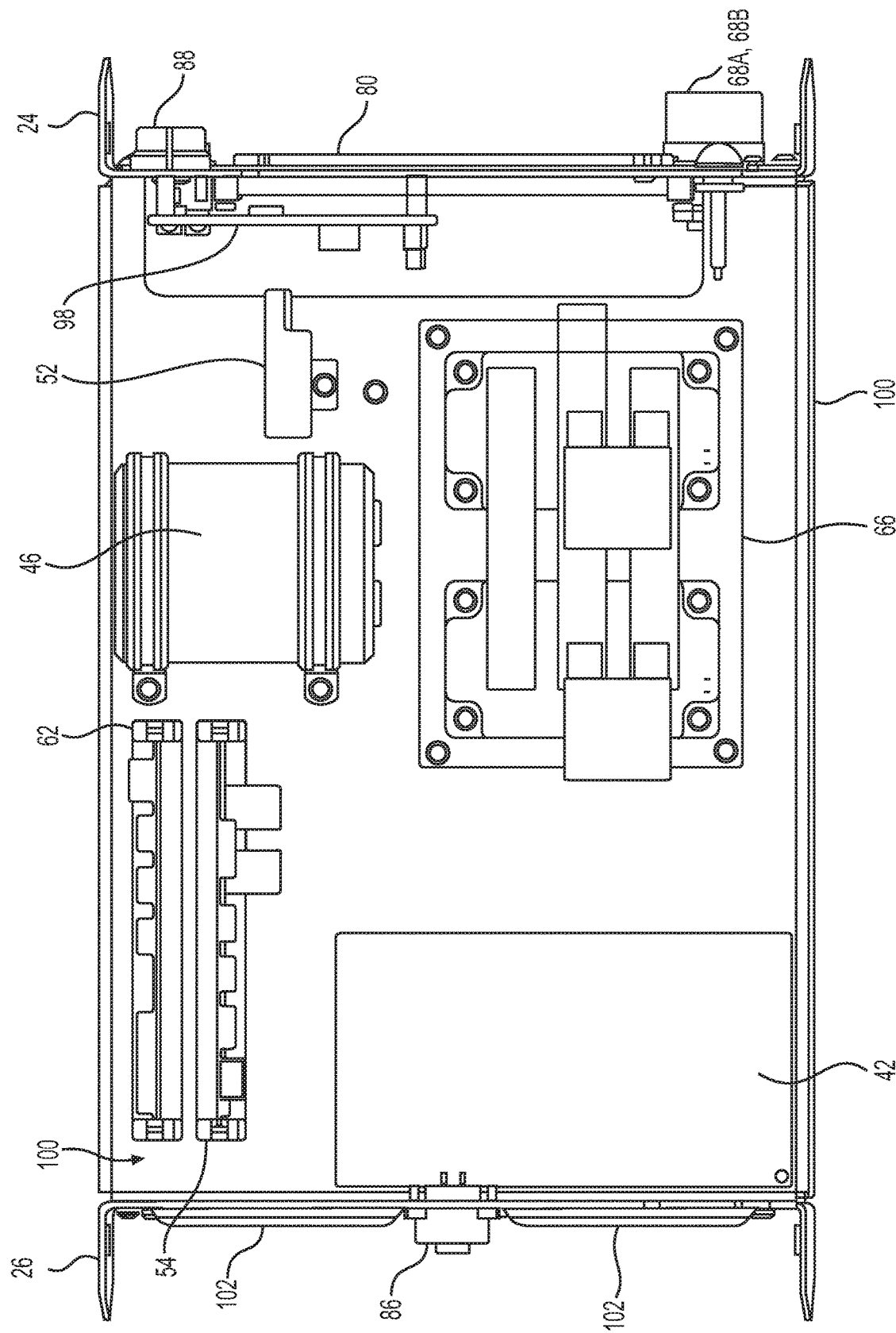
FIG. 5 is a top view of the portable drawn arc stud welder of FIG. 2.
Figure 6:
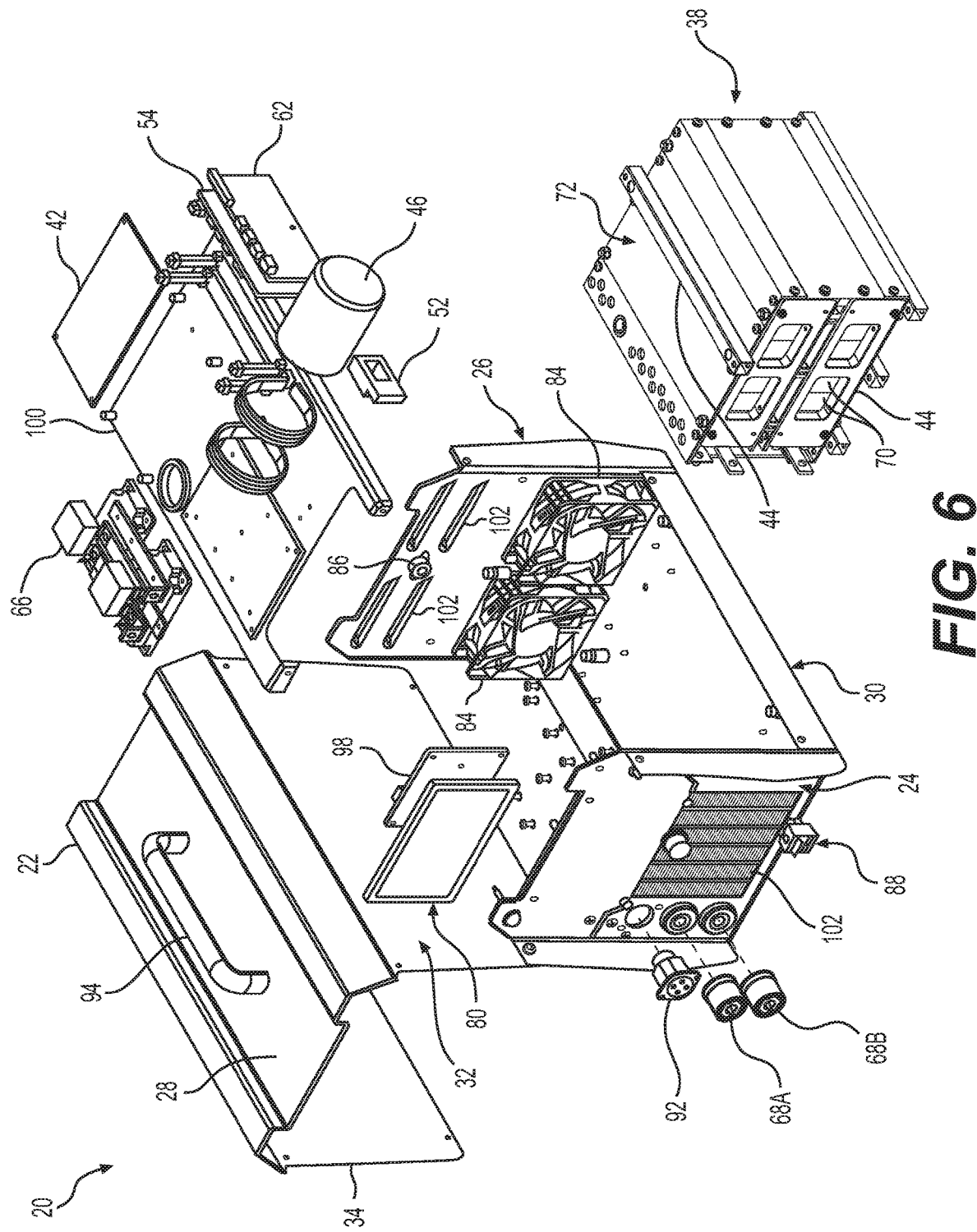
FIG. 6 is an exploded view of the portable drawn arc drawn arc stud welder of FIG. 2.

Referring to the Figures, wherein like numerals indicate corresponding parts throughout the several views, portable drawn arc stud welder apparatus 20 is generally shown for welding a stud onto a workpiece. A portable drawn arc stud welder apparatus 20 includes a housing 22 that generally has a cuboid shape and includes a front wall 24, a back wall 26, a top wall 28, a bottom wall 30, a first side wall 32 and a second side wall 34. As best illustrated in FIGS. 1-6, the portable drawn arc stud welder apparatus 20 includes a LFP battery 38, a SWBCS 42, a weld gun coil capacitor 46, a weld current sensor 52, a weld gun control system board 54, an input sensing control system board 62, a switching transistor (e.g., an insulated gate bipolar transistor (IGBT)) 66, a pair of weld terminals 68, an LCD user interface 80, at least a pair of cooling fans 84, a charge port 86, a power switch 88, a weld gun control connector 92, a handle 94, feet 96, and a LCD user interface board 98.

FIGS. 2-6 illustrate an embodiment of portable drawn arc stud welder apparatus 20 with housing 22 removed. First side wall 32 includes a pair of weld terminals 68. Weld terminals 68 include a negative ("−") terminal 68A and a positive ("+") terminal 68B. Also disposed on first side wall 32 is an LCD user interface 80 (see, for example, FIG. 11). LCD user interface 80 is a capacitive touch screen with which an operator/user can operate portable drawn arc stud welder apparatus 20 and adjust various characteristics of the operation of portable drawn arc stud welder apparatus 20. First side wall 32 also includes a power (on/off) switch 88. First side wall 32 also includes a weld gun control connector 92. Weld gun control connector 92 is configured to receive a weld gun 82 (as shown in FIG. 9). First side wall 32 includes vents 102 that are configured to facilitate air flow into and/or out of housing 22 and are configured with fans 84.

A component shelf 100 is attached to front wall 24 and/or back wall 26, and includes mounting locations for one or more components of portable drawn arc stud welder drawn arc 20. In embodiments, component shelf 100 includes (i.e., support) SWBCS 42. SWBCS 42 is configured as one or more printed circuit boards (PCBs) that includes one or more computer components (e.g., a processor, memory, and/or systems on a chip). SWBCS 42 is connected via component shelf 100 to one or more other components of portable drawn arc stud welder apparatus 20, such as by wiring or other electrical interfaces. Component shelf 100 includes weld gun coil capacitor 46. Weld gun coil capacitor 46 is connected via component shelf 100 to one or more other components of portable drawn arc stud welder apparatus 20. Component shelf 100 includes weld current sensor 52. Weld current sensor 52 is configured as one or more printed circuit boards (PCBs) that include one or more computer components (e.g., a processor, memory, and/or systems on a chip). Weld current sensor 52 is connected via component shelf 100 to one or more other components of portable drawn arc stud welder apparatus 20, such as by wiring. Component shelf 100 includes weld gun control system board 54. Weld gun control system board 54 is configured as one or more printed circuit boards (PCBs) that include one or more computer components (e.g., a processor, memory, and/or systems on a chip). Weld gun control system board 54 is connected via component shelf 100 to one or more other components of portable drawn arc stud welder apparatus 20. Component shelf 100 includes input sensing control system board 62. Input sensing control system board 62 is configured as one or more printed circuit boards (PCBs) that include one or more computer components (e.g., a processor, memory, and/or systems on a chip). Input sensing control system board 62 is connected via component shelf 100 to one or more other components of portable drawn arc stud welder apparatus 20. Component shelf 100 includes a switching transistor (e.g., an integrated bipolar gate transistor (IGBT)) 66. The IGBT 66 is configured as a switching transistor in order to perform its needed role to regulate weld discharge current for drawn arc stud welding, while additionally providing a means to disable battery discharge current when required by SWBCS 42. The IGBT 66 replaces by its integration with SWBCS 42, a large, bulky relay (e.g., 900 A relay), or an expensive and/or large and heavy transistor. The IGBT 66 is connected via component shelf 100 to one or more other components of portable drawn arc stud welder apparatus 20. Component shelf 100 includes an LCD user interface driver board 98 for the LCD user interface 80. LCD user interface driver board 98 is configured as one or more printed circuit boards (PCBs) that include one or more computer components (e.g., a processor, memory, and/or systems on a chip). LCD user interface driver board 98 is connected via component shelf 100 to one or more other components of portable drawn arc stud welder apparatus 20.

A back wall 26 is also be connected to component shelf 100. Back wall 26 includes a charge port 86 and vents 102. Charge port 86 is configured to receive a charging cord (not shown) and vents 102 is configured to engage one or more fans 84. Vents 102 that is configured to facilitate air flow into and/or out of housing 22 via one or more fans 84. First side wall 32 and second side wall 34 is configured to engage a bottom wall 30. Bottom wall 30 includes support for LFP battery 38, one or more fans 84, and one or more feet 96.

Figure 7:
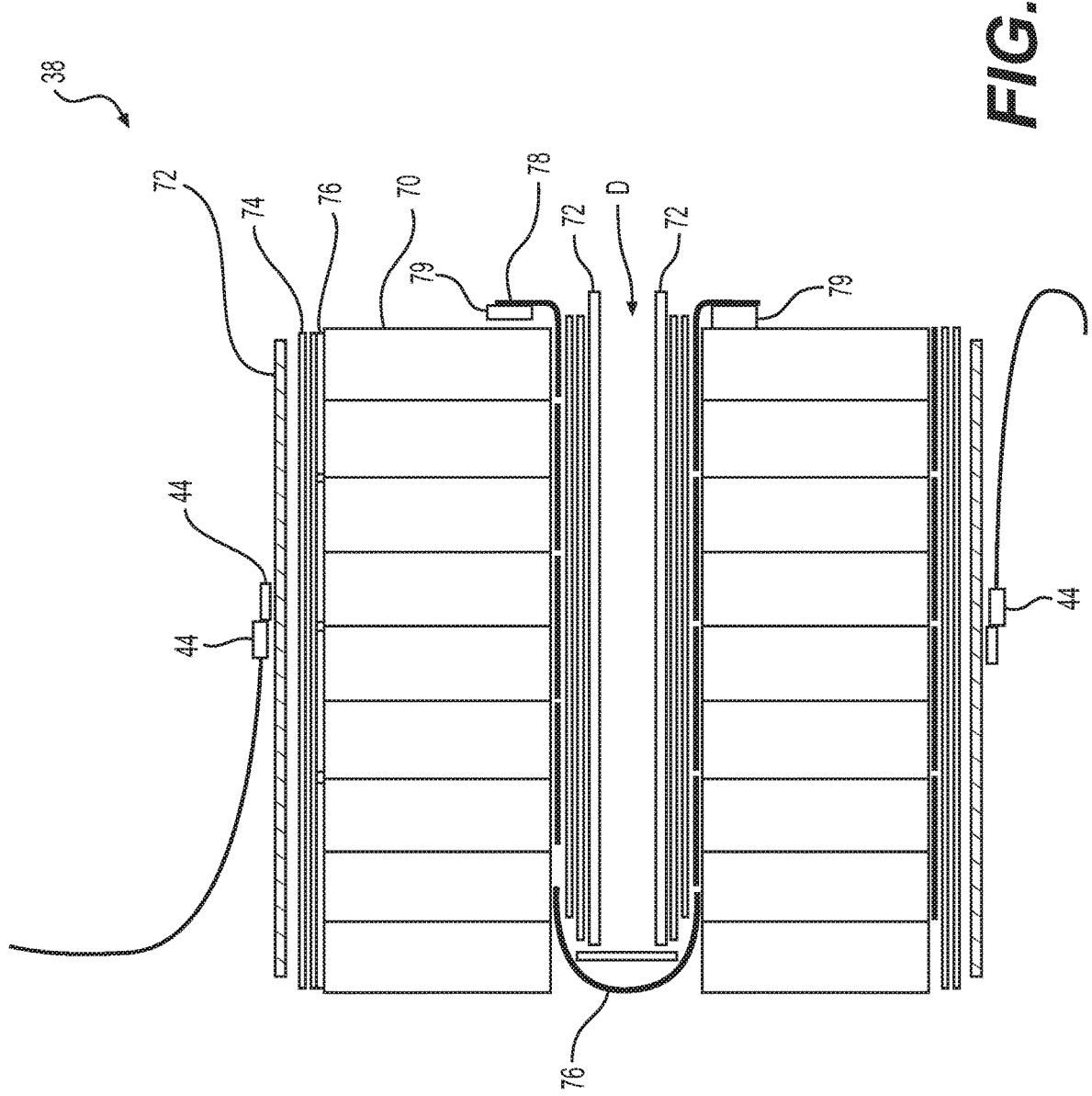
FIG. 7 is a side view of the LFP battery of the portable drawn arc stud welder of FIG. 2.

Referring now to FIG. 7, an embodiment of LFP battery 38 of portable drawn arc stud welder apparatus 20 is shown. LFP battery 38 includes a plurality of individual LFP battery cells 70. As discussed herein, LFP battery cells 70 are arranged in arrays of LFP cells 70, and the arrays of LFP cells 70 are combined (i.e., physically and/or electrically) to form LFP battery 38. In embodiments, LFP battery cells 70 are connected (i.e., combined), electrically in series. For example, a positive terminal of a first LFP battery cell 70 is connected to a negative terminal of a second LFP battery cell 70. This configuration may be repeated until, for example and without limitation, sixteen (16) LFP battery cells 70 are joined in series. Additionally and alternatively, LFP battery cells 70 are connected electrically in parallel.

In embodiments, LFP battery cells 70 are of a shape/size such as 26 mm diameter×65 mm long. It should be understood that other sizes and/or shapes of LFP battery cells 70 are contemplated, and the characteristics of LFP battery cells 70 described herein are exemplary and not limiting. LFP battery cells 70 have the characteristics of LFP batteries as described herein, such as a specific energy of 90-120 Wh/kg, a very low internal resistance, a cycle life of 1000-2000 cycles. (based on 80% depth of discharge), a charge time of 1-2 hr., a less than a 5% rate of self-discharge/month (at room temperature), a nominal cell voltage of 3.2-3.3 V, a charge cutoff voltage of 3.60 V/cell, a discharge cutoff voltage of 2.50 V/cell.

Returning to FIG. 7, LFP battery cells 70 are shown arranged in arrays (i.e., rows), of nine (9) LFP cells connected electrically in parallel to each other by a cell buss bar 76. Cell buss bar 76 is configured such that a first end of a cell buss bar 76 is connected to a first LFP battery cell 70 and subsequent terminals of cell buss bar 76 (not shown) electrically connect LFP battery cells 70 two through nine, forming a row of LFP battery cells 70 as shown in FIG. 7. Disposed around LFP battery cells 70, such as, but not limited to on top of and underneath LFP battery cells 70 are insulation/thermal pads 74. Insulation/thermal pads 74 provide thermal conduction for cooling LFP battery cells 70.

Battery terminal buss bar 78 is shown electrically connected to LFP battery cells 70. Battery terminal buss bar 78 includes a terminal end portion 79 that is configured to distribute electrical energy stored within LFP battery cells 70 and/or receive electrical energy from charge port 86 via at least SWBCS 42.

LFP battery 38 includes heat sink walls 72 that are configured to receive LFP battery cells 70, insulation/thermal pads 74, cell buss bars 76, battery terminal buss bars 78, and/or temperature sensors 44. Heat sink walls 72 are constructed of a material with a high thermal conductivity, such as aluminum, as heat sink walls 72 function as an integral means to transfer heat from LFP battery cells 70 into the forced air stream moving through designed duct spaces on all sides of LFP battery 38, including at least a central duct D through LFP battery 38, as shown in FIG. 7. Heat sink walls 72 are configured with components (not shown) to allow heat sink walls 72 to be securely attached to portable drawn arc stud weld apparatus 20, such as bottom wall 30. Heat sink walls 72 include openings (i.e., apertures), to facilitate air flow from fans 84 and/or heat dissipation from and around LFP battery cells 70. Heat sink walls 72 are configured to receive one or more temperature sensors 44, such as, but not limited to, on the top and bottom surfaces of heat sink walls 72 as shown in FIG. 7.

Figure 8:
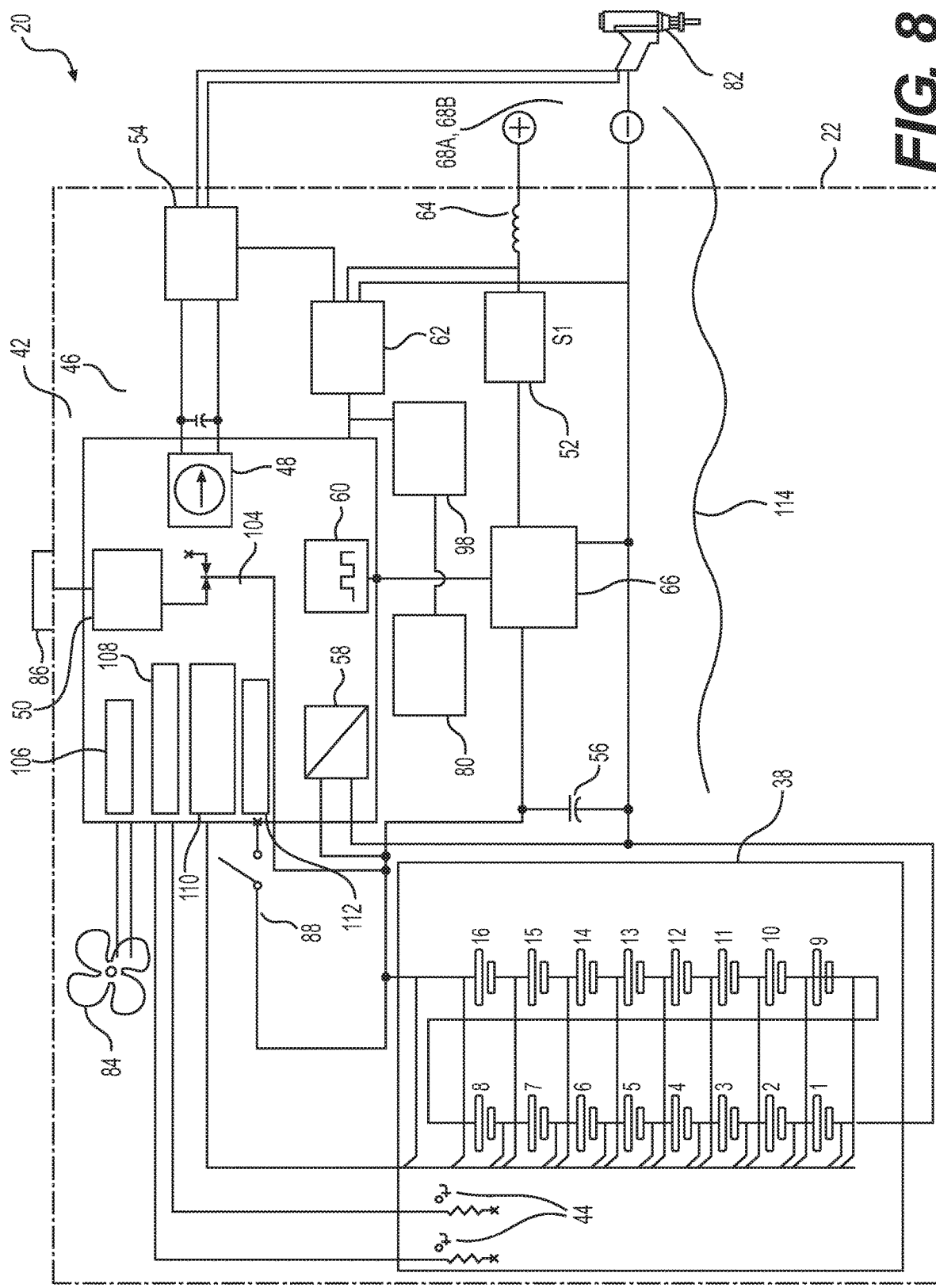
FIG. 8 is a schematic of the portable drawn arc stud welder of FIG. 2.

FIG. 8 is a schematic diagram of an embodiment of portable drawn arc stud weld apparatus 20. Housing 22 includes LFP battery 38 including a plurality of LFP battery cells 70. Temperature sensors 44 are disposed on LFP battery 38 as shown in FIG. 7. Both LFP battery 38 and temperature sensors 44 are electrically connected to SWBCS 42. In embodiments, SWBCS 42 is configured to measure one or more temperatures of LFP battery 38 via temperature sensors 44 against one or more predetermined temperature levels or ranges stored in SWBCS 42 before, during, or after SWBCS 42 balances voltage level the plurality of LFP battery cells 70. SWBCS 42 is configured to selectively control one or more fans 84 disposed in housing 22 if the measured temperature of LFP battery 38 exceeds the predetermined temperature level or range stored in SWBCS 42, and/or in response to other control variables described herein. SWBCS 42 is configured to selectively control one or more fans 84 via fan control module 106 when the measured temperature drops below the predetermined temperature level or range stored in SWBCS 42, and/or in response to other control variables described herein.

LFP battery 38 is charged via charge port 86 disposed on housing 22. Charge port 86 is electrically connected to SWBCS 42. SWBCS 42 includes charge current sensor 50 to monitor, measure, and/or regulate the current provided to LFP battery cells 70 of LFP battery 38. A charge relay 104 is included in the LFP battery 38 charge circuit. Charge relay 104 is activated by SWBCS 42 during a charge cycle, such as when SWBCS 42 determines via thermal sensing module 108 and/or temperature sensors 44 that the measured temperatures of LFP battery 38 are above a predetermined temperature level stored in SWBCS 42. Additionally and alternatively, charge relay 104 is activated by SWBCS 42 during a charge cycle, such as when SWBCS 42 determines, via cell sensing and balancing module 110, that the charge level of LFP battery cells 70 of LFP battery 38 is measured to be above a predetermined charge level stored in SWBCS 42. It should be noted that SWBCS 42 can monitor, measure, and/or regulate LFP battery 38 whether or not power switch 88 is turn on (i.e., activated by a user).

Power switch 88 is configured with a power enable module 112. Power enable module 112 is included within SWBCS 42 to determine the position of power switch 88 disposed on housing 22. For example, power enable module 112 provides a signal to SWBCS 42 as to the status of power switch 88. This signal is used by SWBCS 42 to determine whether portable drawn arc stud weld apparatus 20 is in an off state, a charge only state, a charge and weld state, or a weld state.

SWBCS 42 is configured with cell sensing and balancing module 110. Cell sensing and balancing module 110 includes current and voltage measurement devices and/or applications to monitor, measure and/or regulate the levels of voltage and current of LFP battery cells 70 of LFP battery 38. In embodiments, cell sensing and balancing module 110 performs battery balancing on LFP battery cells 70. Battery balancing includes determining the voltage level of each LFP battery cell 70, comparing the determined voltages, and adjusting the voltages according to predetermined voltages stored in SWBCS 42. For example, a predetermined voltage for LFP battery cells 70 may be 3.0 V. A measurement of LFP battery cells 70 by SWBCS 42 determines that some LFP battery cells 70 are above 3.0 V, some are below 3.0 V, and some are at 3.0 V. In embodiments, cell sensing and balancing module 110 of SWBCS 42 discharges energy from LFP battery cells 70 that are over 3.0 V to balance them with LFP battery cells 70 that are below 3.0 V. In embodiments, cell sensing and balancing module and/or SWBCS 42 displays one or more messages on LCD user interface 80 for the operator/user, describing the status of LFP battery cells 70 of LFP battery 38.

SWBCS 42 also includes a power supply 58 configured as a plurality of DC/DC converters linked together, or "daisy-chained" to a single DC/DC converter, the single DC/DC converter having a larger capacity than the plurality of DC/DC converters. The single DC/DC converter is configured with a broader operating range than the plurality of DC/DC converters to process the varying voltage from battery terminal buss bars 78 of LFP battery 38. Additionally, the single DC/DC converter is equipped with an enable input pin (not shown) that is activated by operation of power switch 88 and/or power enable module 112. By using the single DC/DC converter of power supply 58, the current through power switch 88 is kept at a lower level for operator/user safety and/or for automatic activation by charging using charge port 86 or other peer welders of the same type as portable drawn arc stud welder 20. Power supply 58 also is connected to a weld power switching power supply 60. Weld power switching power supply 60 is connected to IGBT 66, part of weld discharge circuit 114.

SWBCS 42 also includes a boost charge module 48 connected to weld gun coil capacitor 46, weld gun control system board 54, and/or weld gun 82. Boost charge module 48 is configured, through SWBCS 42, to provide the current to charge weld gun coil capacitor 42 up with energy adequate to supply the solenoid of weld gun 82 for a stud weld.

SWBCS 42 is connected to input sensing control system board 62 that is also connected to weld current sensor 52, weld gun control system board 54, LCD user interface 80, and weld discharge circuit 114.

Weld discharge circuit 114 of portable drawn arc stud welder 20 includes a weld current sensor 52, a capacitor 56, weld choke 64, an IGBT 66, and weld terminals 68. Weld current sensor 52 is configured as a Hall Effect transducer, with high frequency response characteristics to detect high speed pulses that enable SWBCS 42 to rapidly respond to overcurrent conditions, for example. Weld current sensor 52 is configured to isolate SWBCS 42 from the welding circuit (i.e., weld discharge circuit 114). Weld current sensor 52 is configured as a Hall Effect transducer that also provides a protective barrier preventing electrical noise from interfering with SWBCS 42.

Figure 9A:
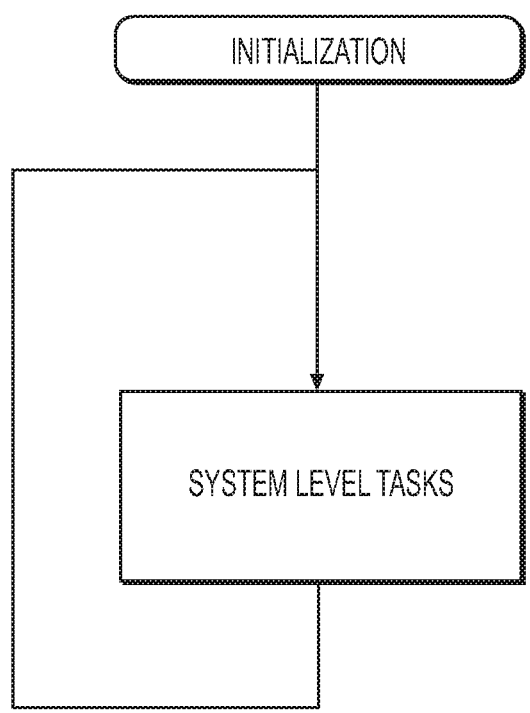
FIGS. 9A-9F are flowcharts illustrating some embodiments of control logic, including that within the SWBCS, of the portable drawn arc stud welder of FIG. 2.

Referring to FIG. 9A, a flowchart details the operation of SWBCS 42 and its programming. As described herein, SWBCS 42 is implemented in a computer including at least a processor and a memory. Non-limiting examples of a computer are a system-on-a-chip and a digital controller.

After initialization, SWBCS 42 performs a number of system level tasks. These system level tasks of SWBCS 42 are executed simultaneously, linearly, or in a combination thereof. In embodiments, some system level tasks are not executed, depending at least upon the operational status of welder 20 and/or SWBCS 42.

Figure 9B:
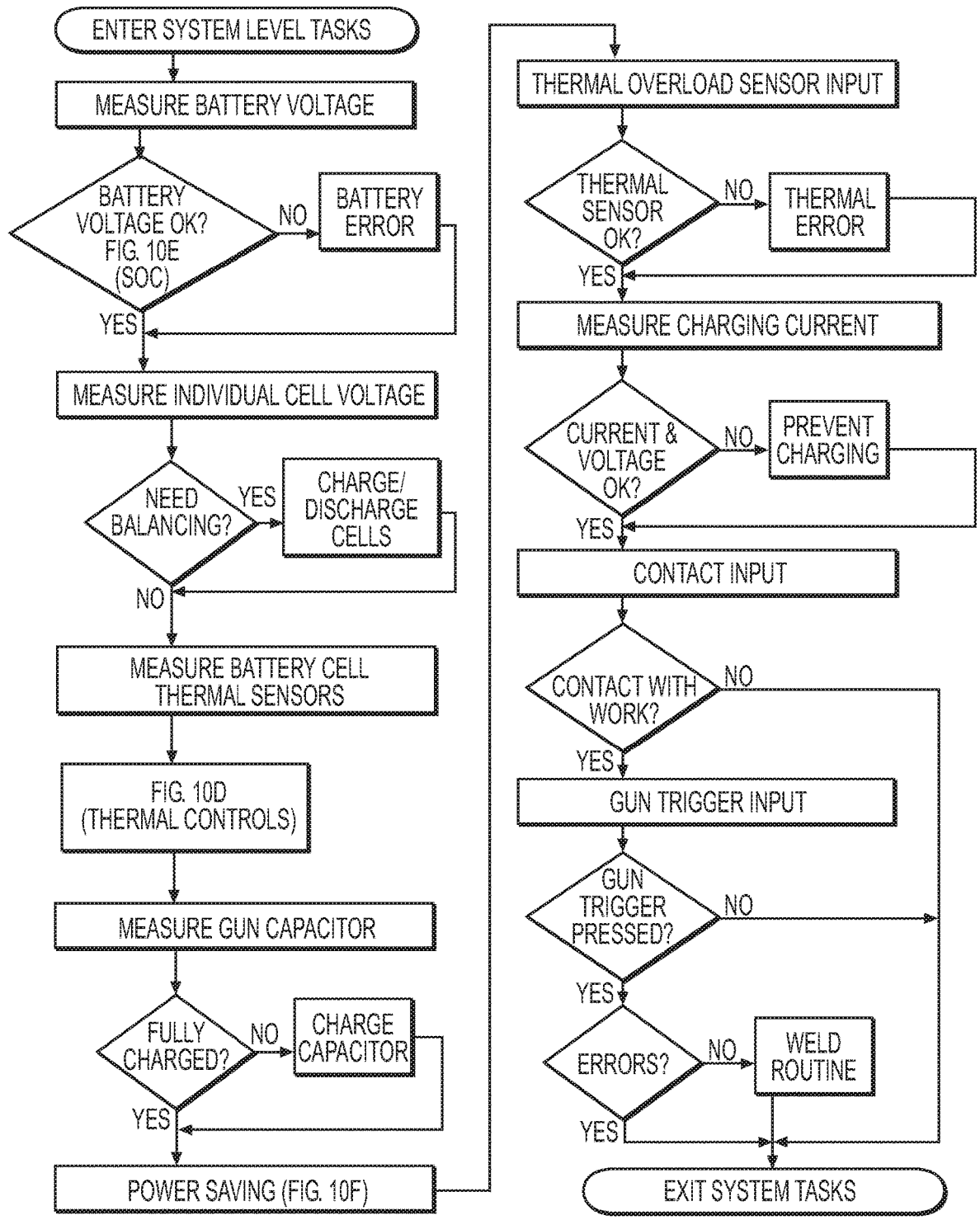

In FIG. 9B, the first of a number of a system level tasks that are executed by SWBCS 42. The first task is Measure Battery Voltage. SWBCS 42 measures the voltage of LFP battery 38. The measurement of the voltage of LFP battery 38 includes multiple sampling averaged over time for each LFP battery cell 70 of LFP battery 38. If the voltage of LFP battery 38 is below a predetermined threshold (such as programmed into control system 42), a low LFP battery voltage signal is produced and is displayed on LCD user interface 80. If the voltage of LFP battery 38 is at a predetermined threshold, an OK LFP battery voltage signal is produced and is displayed on LCD user interface 80.

Figure 9C:
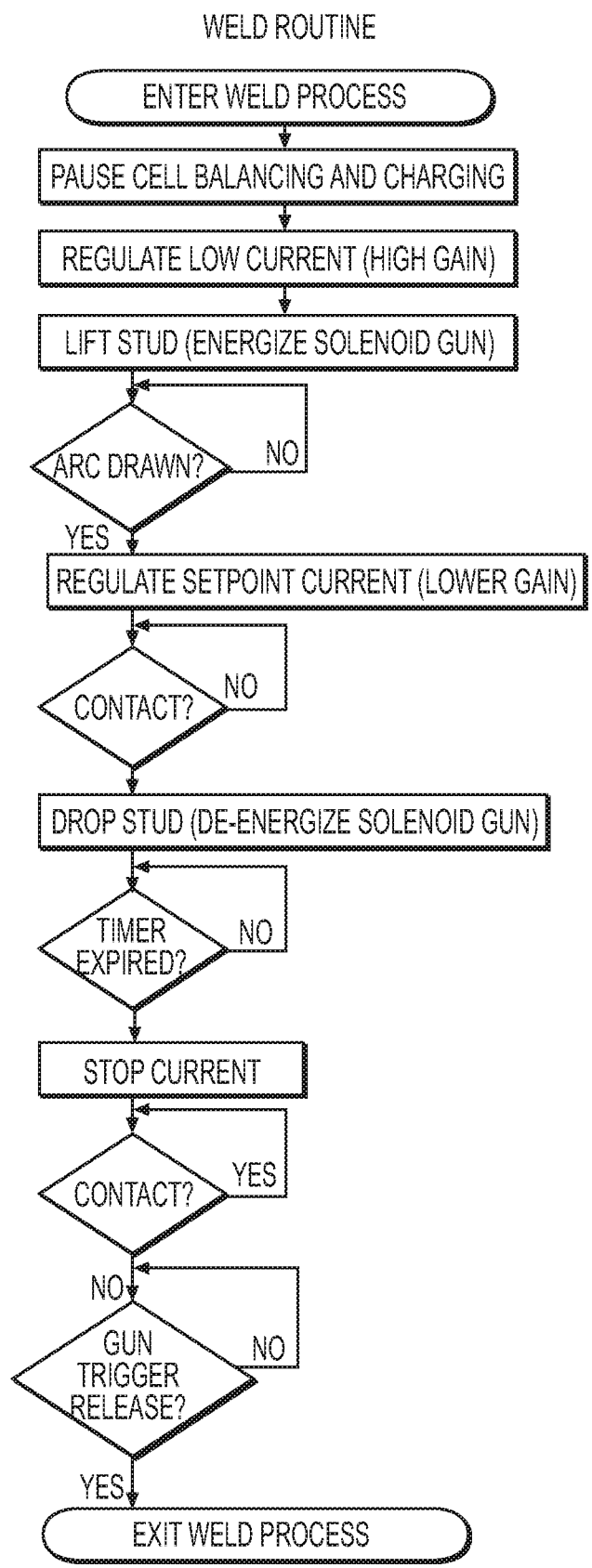
Figure 9D:
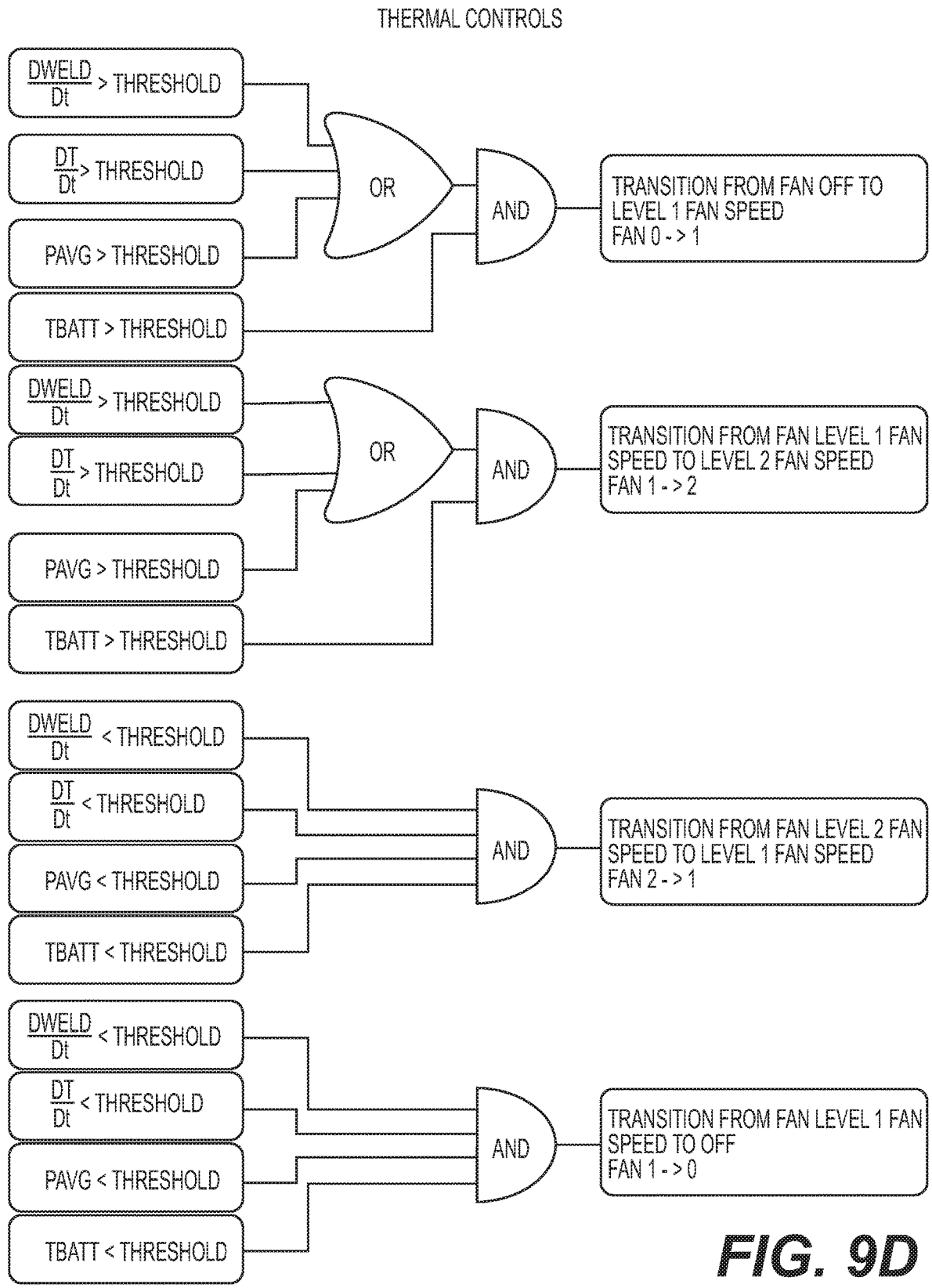
Figure 9E:
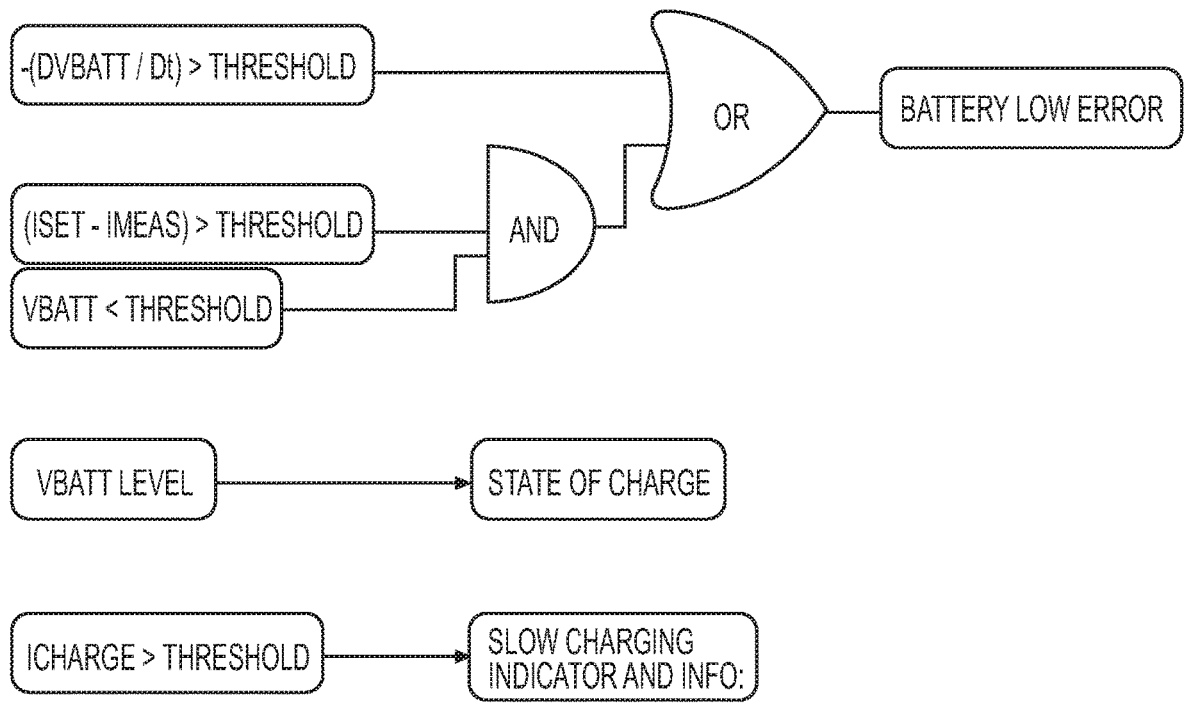
Figure 9F:
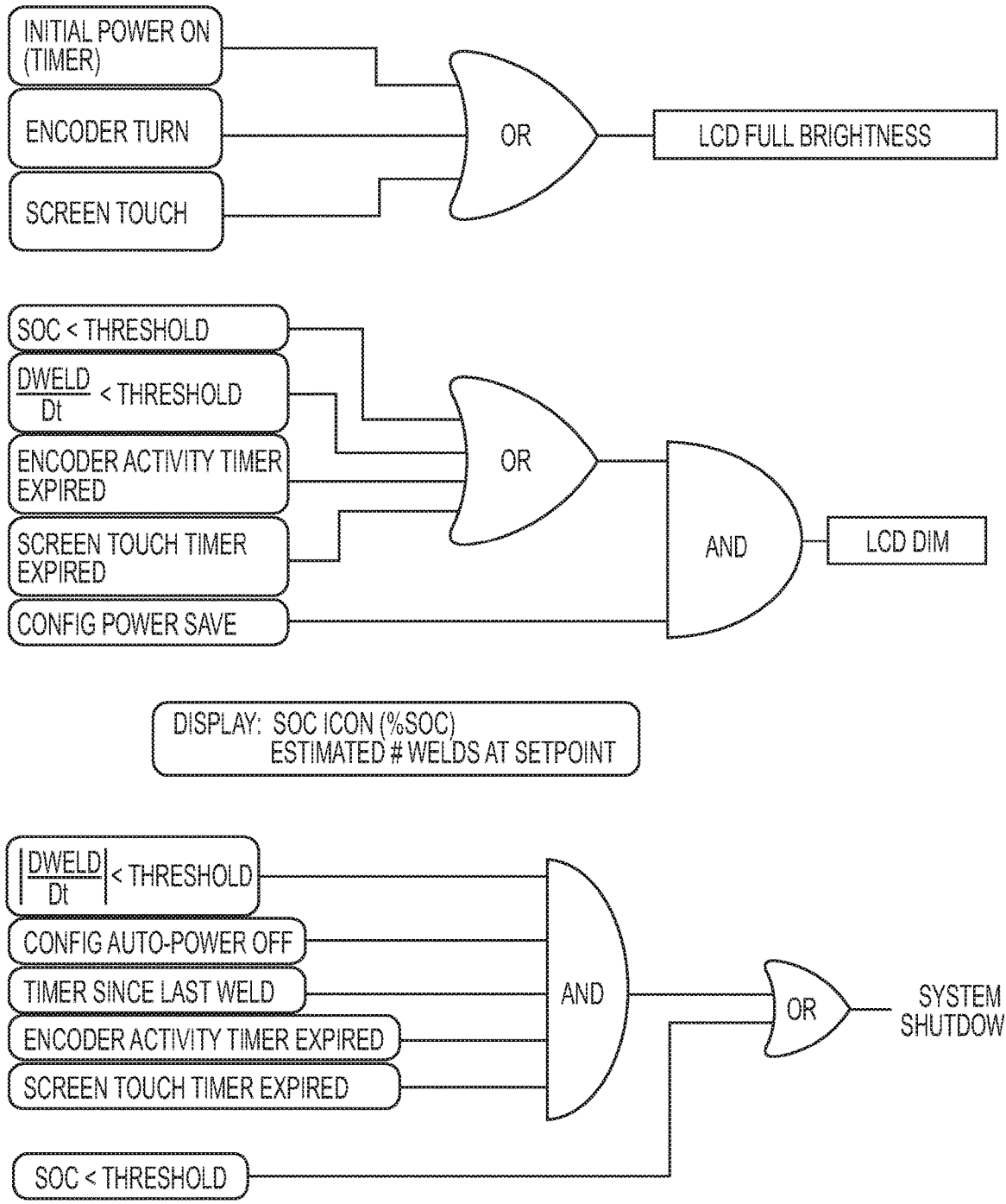

As further described in FIG. 9E, system level task Measure Battery Voltage involves several state of charge (SOC) detections/reactions by at least SWBCS 42 and/or other components of welder 20. When the rate of change of a measured LFP battery 38 voltage from a sequence of consecutive welds exceeds a predetermined level, a Battery Low error is generated. Or, if the difference between the weld current setpoint and the actual weld current exceeds a predetermined value, and the measured LFP battery 38 voltage is below a predetermined voltage level, a "Battery Low" error message is generated at least by SWBCS 42, and is displayed on LCD user interface 80. Additionally and/or alternatively, SWBCS 42 measures the voltage of LFP battery 38 and determines a state of charge (SOC) of LFP battery 38 that is displayed on LCD user interface 80. Additionally and/or alternatively, SWBCS 42 measures charging current for LFP battery 38 and/or determines if the measured charging current of LFP battery 38 is above a predetermined charging current level. The measured charging current (and/or other relevant data) of LFP battery 38 is displayed on LCD user interface 80.

Another system level task is Measure Individual Cell Voltage. SWBCS 42 is configured to measure the voltage of each bank of parallel-connected LFP battery cells 70 of LFP battery 38. After obtaining a measurement of the voltage of each bank of parallel-connected LFP battery cells 70 of LFP battery 38, SWBCS 42 compares the individual banks of LFP battery cells 70 to each other to determine if balancing is required. Battery balancing involves transferring energy from banks of LFP battery cells 70 of LFP battery 38 until the voltage level of all of the banks of LFP battery cells 70 of LFP battery 38 have a voltage level that is within a predetermined narrow range, for example. SWBCS 42 is configured to continue balancing while completing other system level tasks.

If battery balancing is required (i.e., the voltage of the cells of LFP battery 38 is unbalanced and/or unequal), SWBCS 42 is configured to transfer energy from cells until the LFP battery cells 70 of LFP battery 38 are balanced (i.e., are within a predetermined balance range). If battery balancing is not required (i.e., the cells of LFP battery 38 are balanced), SWBCS 42 will not perform this task.

Another system level task of SWBCS 42 is Measure Battery Cell Thermal Sensors. SWBCS 42 uses temperature sensors 44 to measure temperatures of LFP battery 38. Temperature sensors 44 may be, for example, thermocouples, or negative temperature coefficient (NTC) thermistors configured to measure temperature using electrical energy. Temperature sensors 44 are disposed at least about LFP battery 38 of welder 20. Temperature sensors 44 are also disposed about housing 22, for example. As described herein, temperature sensors 44 are disposed within LFP battery 38, such as around or near one or more cells of LFP 38.

SWBCS 42, using temperature sensors 44, receives temperature measurements (i.e., readings), of temperatures at the various locations of temperature sensors 44, including, but not limited to, LFP battery 38. Upon receiving the temperature measurements from temperature sensors 44, SWBCS 42 determines, using application software, for example, whether LFP battery 38 (or other components of welder 20) require cooling (i.e., a reduction in temperature or whether the welding process should be ended).

If SWBCS 42, through the data obtained from temperature sensors 44 determines that the temperature measurements from temperature sensors 44 are within a predetermined temperature range (i.e., temperature "OK"), then SWBCS 42 turns off (or selectively controls) one or more fans 84 of welder 20. In embodiments, SWBCS 42, upon startup, activates fans 84 automatically, before performing the system level task Measure Battery Cell Thermal Sensors. This activation occurs to lower the temperature of LFP battery 38 and/or other components of welder 20, such as in situation where welder 20 is in a hot environment (e.g., closed vehicle on a hot day, sun soak, or as a pre-emptive action in response to a high weld rate before sensing a high temperature via temperature sensors 44).

If SWBCS 42, through the data obtained from temperature sensors 44 determines that the temperature measurements from temperature sensors 44 are not within a predetermined temperature range (i.e., temperature "too high"), SWBCS 42 activates one or more fans 84 of welder 20.

SWBCS 42 continues to obtain data from temperature sensors 44 for a predetermined time period, such as during which time welder 20 is powered on, or while welder 20 is powered on and operating in welding mode (i.e., discharging current to a workpiece, or while charging).

As further described in FIG. 9D, system level task Measure Battery Cell Thermal Sensors involves thermal measurements/determinations by at least SWBCS 42 and/or other components of welder 20.

As described herein, welder 20 includes one or more fans 84. Fans 84 are configured to operate at one or more speeds and/or to operate at variable speeds (e.g., selectively control). For example and without limitation, a first fan 84 is configured to operate at a "low" and a "high" speed, with the speed (i.e., rpm), of the first fan 84 at a low speed may be approximately 500 rpm, while the high speed may be approximately 1000 rpm. A second fan 84 is configured to operate at variable speeds throughout the operating range of the second fan 84. Additional fans 84 may be included in welder 20 and may be configured to operate with vents 102 and/or other air flow management devices (not shown).

A first thermal measurement/determination includes a transition of fans 84 from "off" to a first speed (e.g., "low"). If either a measured weld frequency exceeds a predetermined weld frequency level, or a measured battery temperature rate of change exceeds a predetermined temperature rate of change level, or if the measured average power from LFP battery 38 exceeds a predetermined average power level and if the measured temperature level of LFP battery 38 exceeds a predetermined level, fans 84 are configured from "off" to a first speed. In alternative embodiments, a configuration from "off" is to a variable speed, that may be proportional (or have another relationship) to the amount(s) exceeding the respective predetermined level(s).

A second thermal measurement/determination includes a transition of fans 84 from a first ("low") speed to a second ("high") speed. If either a measured weld frequency exceeds a predetermined weld frequency level, or a measured battery temperature rate of change exceeds a predetermined temperature rate of change level, or if the measured average power from LFP battery 38 exceeds a predetermined average power level and the measured temperature of LFP battery 38 exceeds a predetermined temperature of LFP battery 38, fans 84 are configured from the first "low" speed to the second "high" speed. In alternative embodiments, a configuration from a first variable speed to a second variable speed, each of which may be proportional (or have another relationship) to the amount(s) exceeding the respective predetermined level(s).

A third thermal measurement/determination includes a transition of fans 84 from a first ("high") speed to a second ("low") speed. If a measured weld frequency is below a predetermined weld frequency level, and a measured battery temperature rate of change is below a predetermined temperature rate of change level, and if the measured average power from LFP battery 38 is below a predetermined average power level and the measured temperature of LFP battery 38 is below a predetermined temperature of LFP battery 38, fans 84 are configured from the first "high" speed to the second "low" speed. In alternative embodiments, a configuration from a first variable speed to a second variable speed, each of which may be proportional (or have another relationship) to the amount(s) below the respective predetermined level(s).

A fourth thermal measurement/determination may include a transition of fans 84 from a "low" speed to off (i.e., inactive). If a measured weld frequency is below a predetermined weld frequency level, and a measured battery temperature rate of change is below a predetermined temperature rate of change level, and if the measured average power from LFP battery 38 is below a predetermined average power level and the measured temperature of LFP battery 38 is below a predetermined temperature of LFP battery 38, fans 84 are configured from the "low" speed to off. In alternative embodiments, a configuration from a variable speed to off, which may be proportional (or have another relationship) to the amount(s) below the respective predetermined level(s).

Another system level task is Measure Gun Capacitor. SWBCS 42 determines whether weld gun coil capacitor 46 is fully charged. If SWBCS 42 determines that weld gun coil capacitor 46 is not fully charged, SWBCS 42 activates boost charge module 48 to fully charge weld gun coil capacitor 46 to a predetermined voltage level (a predetermined level determined by welder 20). When weld gun coil capacitor 46 is fully charged, as determined by SWBCS 42, SWBCS 42 moves to the next system level task, Thermal Overload Sensor Input. Similarly, if SWBCS 42 determines that weld gun coil capacitor 46 is already fully charged (i.e., no further charge is needed based on a predetermined level).

Another system level task is Power Saving. Power Saving includes a determination by SWBCS 42 (and/or other components of welder 20) if timer 134 is initially activated (i.e., welder 20 is turned "on") or if an encoder of welder 20 is turned, or if LCD user interface 80 is activated (i.e., touched by an operator/user), then the condition of LCD user interface 80 is configured from a power saving condition (i.e., dimmed), to a full power condition (i.e., full brightness).

A second Power Saving task includes a determination by SWBCS 42 (and/or other components of welder 20) if a measured state of charge (SOC) is less than a predetermined SOC level or if a measured weld frequency decreases below a predetermined weld frequency level or if an encoder of welder 20 is determined by SWBCS 42 (and/or other components of welder 20) to have been inactive for a predetermined time period or if LCD user interface 80 is determined by SWBCS 42 (and/or other components of welder 20) to have been inactive (i.e., not touched by an operator/user) for a predetermined time period and if welder 20 has been configured (by the operator/user and/or SWBCS 42) to a power saving configuration then the condition of LCD user interface 80 is configured from a full power condition (i.e., full brightness) to a power saving condition (i.e., dimmed).

A third Power Saving task includes SWBCS 42 (and/or other components of welder 20) configuring LCD user interface 80 to display, for an operator/user, a state of charge (SOC) icon (e.g., a stylized battery), and/or provide an estimate (based at least in part on a determination by SWBCS 42) of a number of welds at the operator/user's set point. The operator/user may use this information to determine how to utilize the remaining charge of LFP battery 38 (e.g., perform more welds at a lower power setting).

A fourth Power Saving task includes a determination by SWBCS 42 (and/or other components of welder 20) if a measured weld frequency is below a predetermined weld frequency threshold and if welder 20 is configured to automatically turn off (i.e., auto power off), and a measured time since the last weld operation exceeds a predetermined time period and an encoder of welder 20 has not been activated and LCD user interface 80 has not been touched (i.e., touch screen time-out has not expired) or the measured state of charge (SOC) of LFP battery 38 is below a predetermined SOC level, then welder 20 shuts down automatically. In the situation of the measured SOC of LFP battery 38 resulting in welder 20 shutdown, the shutdown is for protection of LFP battery 38 (i.e., prevent damage to LFP battery 38). In the other situations described in the fourth Power Saving task, the shutdown is for convenience of the operator/user (i.e., temporarily leaving welder 20 but intending to return and resume welding).

In system level task Thermal Overload Sensor Input, SWBCS 42 determines the status (i.e., operating condition), of temperature sensors 44. As discussed herein, monitoring the temperature of LFP battery 38 is an important factor in the operation of welder 20. As a result, SWBCS 42 determines the status of each of temperature sensors 44 monitoring LFP battery, as well as any other temperature sensors 44 disposed in welder 20. SWBCS 42 determines the status of temperature sensors 44 by measuring a return voltage or signal provided by temperature sensors 44, for example. SWBCS 42, upon determination of at least one error in temperature sensors 44 (i.e., thermal overload sensor input), deactivates welder 20 or otherwise alter the operation of welder 20, such as to protect LFP battery 38. If SWBCS 42 determines that there are no errors in temperature sensors 44 (i.e., predetermined or expected voltages or signals are returned).

In system level task Measure Battery Charge Current, SWBCS 42 may determine, using battery charge current sensor 50 and voltage measuring circuitry, whether the current and voltage levels are in predetermined current and voltage ranges. If, for example, a bank of LFP battery cells 70 voltage is too low while charging, SWBCS 42 may open charge relay 104 to break the charge path and end the battery charging process and display an error message on LCD user interface 80.

In system level task Contact Input, SWBCS 42 determines, using weld gun 82, whether contact has been made by the stud held by the weld gun 82 and with a workpiece, completing a circuit and providing the conditions for a drawn arc weld process to occur. If SWBCS 42 determines that contact has not been made by the stud held by the weld gun 82 and with the workpiece, the system level tasks are ended, and the drawn arc weld process does not occur. If SWBCS 42 determines that contact has been made by the stud held by the weld gun 82 and with the workpiece, SWBCS 42 allows the weld process to occur.

In system level task Gun Trigger Input, SWBCS 42 determines, using weld gun control system board 54, whether the trigger of weld gun 82 has been pressed (by an operator/user). If SWBCS 42 determines that the trigger of weld gun 82 has not been pressed, the system level tasks are ended, and the drawn arc weld process does not initiate. If SWBCS 42 determines that the trigger of weld gun 82 has been pressed, SWBCS 42 then determines whether there are errors present (e.g., temperature error, low battery charge, weld gun coil short, etc.). If there are no errors present and workpiece contact is made, SWBCS 42 allows the drawn arc weld process to initiate, and after the weld routine executes and finishes the system level tasks end. If there are errors present, the system level tasks are ended, and the drawn arc weld process does not initiate, and the system level tasks end.

Referring to FIG. 9C, the weld process of SWBCS 42 is described. The first step is Enter Weld Process. The weld process begins after an operator/user brings a stud into contact with a workpiece, presses the trigger of weld gun 82, a solenoid of weld gun 82 lifts the stud, stud draws an arc, and after a predetermined arc time elapses, the solenoid of weld gun 82 is de-energized, and the gun spring plunges the stud into the molten pool formed in the workpiece.

The next step, Pause Cell Balancing and Charging, occurs as a result of the initiation of the weld process. At this time, any cell balancing (as described herein) by SWBCS 42 may be paused, or halted. This pausing or halting allows for LFP battery 38 to deliver weld current independently, without drawing current from the charging system, or from the SWBCS.

The next step, Regulate Low Current (high gain) occurs as a relatively low current, called the pilot current, is passed into the short circuit by weld gun 82, and is maintained (i.e., regulated), by SWBCS 42 when the stud is lifted by a small distance from the workpiece, in the next step.

The Lift Stud (energize gun solenoid) step occurs once the low current (pilot current) flow is established between the stud and the workpiece. Weld gun 82 is energized, resulting in an arc forming in the small distance between the stud and the workpiece. SWBCS 42 determines whether an arc is formed or not, such as by determining (i.e., monitoring), the flow of weld discharge current and the arc weld voltage. If SWBCS 42 determines that an arc has been drawn by measuring arc voltage and weld current via weld current sensor 52, the process continues to the next step.

In the next step, Regulate Setpoint Current (lower gain), occurs after a pilot arc has been drawn. SWBCS 42 utilizes a timer function that is set internally (i.e., a predetermined time) or by an operator/user using LCD user interface 80 to set weld time. Weld time is displayed on LCD user interface 80. SWBCS 42 thus controls the length of time the weld arc is drawn (or present) between the stud and the workpiece, and when the arc ends. SWBCS 42, for example, controls a length of weld arc time as short as 100 milliseconds. Once SWBCS 42 determines that the programmed time has elapsed, the process moves to the next step, Drop Stud (de-energize gun solenoid).

In the Drop Stud (de-energize gun solenoid) step, another timer function is used by SWBCS 42 to determine the length of time that current is maintained after the stud is plunged into the workpiece. The time that current flows through the stud into the workpiece is monitored by SWBCS 42. Once that time has expired, SWBCS 42 stops current flow through the stud to the workpiece and a weld is formed, joining the stud and the workpiece.

At this point SWBCS 42 determines whether there is contact between the gun chuck and the welded stud based on the contact detect functions on the input sensing control system board 62. SWBCS 42 continues to determine if the chuck of weld gun 82 is still in contact with the welded stud. If weld gun 82 is no longer in contact with the welded stud, SWBCS 42 then determines if the trigger of weld gun 82 has been released (such as by an operator/user). If the trigger of weld gun 82 has been released, the weld process of SWBCS 42 ends.

Figure 10:
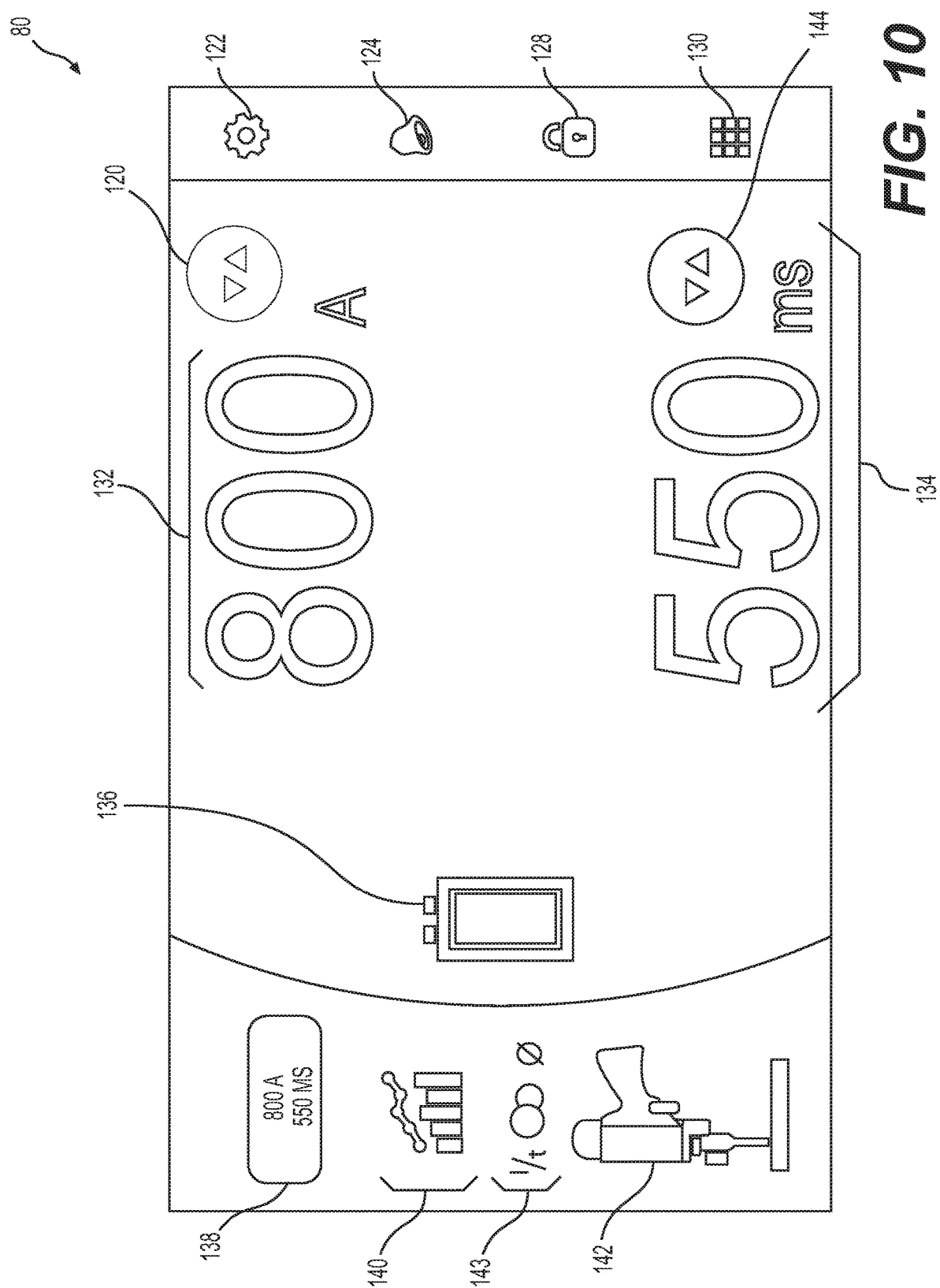
FIG. 10 is an exemplary screenshot of an LCD user interface of the portable drawn arc stud welder of FIG. 2.

FIG. 10 illustrates an exemplary visual readout of LCD user interface 80. LCD user interface 80 includes a plurality of touch screens, one of which is illustrated in FIG. 10. The information displayed on LCD user interface 80 is at least provided to LCD user interface board 98 for display on LCD user interface 80 by SWBCS 42, though other components of welder 20 also utilize LCD user interface 80 and/or LCD user interface board 98 alone or in conjunction with SWBCS 42. It is also contemplated that LCD user interface 80 includes supplemental controls disposed about welder 20 that are used in conjunction with or solely to interact with LCD user interface 80. In the exemplary touch screen shown in FIG. 10, an adjust weld current control 120 is provided. By pressing on adjust weld current control 120, an operator/user raises or lowers the current used in the next weld and shown on LCD user interface 80 as current level 132.

A system setting control 122 is provided on LCD user interface 80. In this embodiment, system setting control 122 is represented by a geared wheel, though other icons may be used. By pressing on system setting control 122, an operator/user causes one or more additional touch screens to appear on LCD user interface 80. These additional screens include, for example, a total weld counter which tracks the total number of weld processes of welder 20; a user weld counter which tracks the total number of weld processes by a particular operator/user and includes a reset option (such as to track a number of welds by an operator/user for a particular task); a factory default option, which returns welder 20 to factory default settings; a service settings password entry option, which is used by an authorized service technician to perform service and/or maintenance on welder 20; and a display voltage option, which allows the operator/user to toggle between displaying the weld voltage on LCD user interface 80.

An error/notification control 124 is provided on LCD user interface 80. In this embodiment, error/notification control 124 is represented by a bell, though other icons may be used. By pressing on error/notification control 124, an operator/user causes one or more additional touch screens to appear on LCD user interface 80. These additional screens include, for example, details of any error messages or other notifications regarding the operation of welder 20 and provide the operator/user with additional information or requests for the operator/user to respond.

A lock/unlock control 128 is provided on LCD user interface 80. In this embodiment, lock/unlock control 128 is represented by padlock, though other icons may be used. By pressing on lock/unlock control 128 an operator/user causes one or more additional touch screens to appear on LCD user interface 80. These additional screens include, for example, a lock/unlock toggle control that if activated by the operator/user, to lock the LCD user interface 80 to prevent any undesired changes to settings made by the operator/user, such as due to an accidental contact of LCD user interface 80 by the operator/user during a welding process.

A preset control 130 is provided on LCD user interface 80. In this embodiment, preset control 130 is represented by a three by three cube, though other icons may be used. By pressing on preset control 130, an operator/user causes one or more additional touch screens to appear on LCD user interface 80. These additional screens include, for example, a preset control screen that includes controls for the operator/user to store and/or recall presets stored in welder 20. For example, weld settings include, but are not limited to, weld time, weld current, lift height, and plunge depth that may be saved and/or recalled by the operator/user.

An adjust weld time control 144 is provided on LCD user interface 80. By pressing on adjust weld time control 144, an operator/user raises or lowers the weld time for the next weld and shown on LCD user interface 80 as timer 134.

A battery charge level 136 is provided on LCD user interface 80. In this embodiment, battery charge level 136 is represented by a stylized battery, though other icons may be used. Battery charge level 136 is displayed to the operator/user by selectively displaying the interior of the stylized battery to represent the battery charge level (e.g., an interior that is half-full represents a half level battery charge).

A weld results control 138 is provided on LCD user interface 80. In this embodiment, weld results control 138 is represented by graphs, though other icons may be used. By pressing on weld results control 138, an operator/user causes one or more additional touch screens to appear on LCD user interface 80. These additional screens include, for example, a screen detailing the details of the previous weld for the operator/user to review.

A weld process monitor 140 is provided on LCD user interface 80. In this embodiment, weld process monitor 140 is represented by graphs, though other icons may be used. By pressing on weld process monitor 140, an operator/user causes one or more additional touch screens to appear on LCD user interface 80. These additional screens include, for example, a chart providing for the operator/user a view of the weld waveform as the result of the previous weld. The chart may include an overlay of the weld current and the weld gun motion.

A weld gun status indicator 142 is provided on LCD user interface 80. In this embodiment, weld gun status indicator 142 displays contact status (with the workpiece), gun trigger status, and/or coil status, by illuminating their respective sections on the graphic indicator.

A Stud Expert control 143 is provided on LCD user interface 80. By pressing on the Stud Expert control 143, an operator/user causes one or more additional touch screens to appear on LCD user interface 80. These additional screens include, for example, a screen which allows the operator/user to input a stud diameter, and to receive the correct settings for weld time and weld current corresponding to the input stud diameter.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility.

What is claimed is:

1. A portable drawn arc stud welder apparatus for welding a stud onto a workpiece, the portable drawn arc stud welder apparatus including:
    a housing;
    a lithium ferrophosphate (LFP) battery disposed in the housing and including a plurality of LFP battery cells;
    a weld stud gun configured to hold a stud electrically connected to the LFP battery for receiving energy from the LFP battery to pass a current through the stud and the workpiece to form a weldment;
    a stud weld battery control system (SWBCS) disposed in the housing electrically connected to the LFP battery of the portable drawn arc stud welder apparatus, wherein the SWBCS includes a processor, and a memory, and instructions therein, to implement control and monitoring of the operation of the portable drawn arc stud welder apparatus;
    the SWBCS configured to measure a rate of change of a voltage of the LFP battery after a sequence of consecutive welds and to determine whether the measured the rate of change exceeds a predetermined rate of change level;
    the SWBCS configured to balance the plurality of battery cells and then measure a temperature of the LFP battery via temperature sensors against a predetermined temperature range at least after the SWBCS balances the plurality of battery cells;
    the SWBCS configured to activate one or more fans disposed in the housing in response to the measured temperature of the LFP battery exceeding a predetermined temperature level and/or if a calculated welding rate exceeds a predetermined welding rate and the SWBCS configured to selectively operate the one or more fans in response to the measured temperature dropping below the predetermined temperature level and/or if the calculated welding rate exceeds the predetermined rate;
    a weld stud gun coil capacitor electrically connected to the SWBCS; and
    the SWBCS configured to measure a charge level of the weld stud gun coil capacitor after the SWBCS measures the temperature of the LFP battery via the temperature sensors against the predetermined temperature range.

2. The portable draw arc stud welder apparatus as set forth in claim 1 wherein the SWBCS is further configured to activate the one or more fans if either a measured weld frequency exceeds a predetermined weld frequency level, or a measured LFP battery temperature rate of change exceeds a predetermined LFP battery temperature rate of change level or if a measured average power of the LFP battery exceeds a predetermined average power of the LFP battery level or if the measured temperature of the LFP battery exceeds a predetermined level, and if a measured LFP battery current level exceeds a predetermined LFP battery current level.

3. The portable draw arc stud welder apparatus as set forth in claim 2, wherein the activation of the one or more fans includes a variable speed relative to at least one of the predetermined weld frequency level, the predetermined LFP battery temperature rate of change level, the predetermined average power of the LFP battery level, and the predetermined LFP battery current level.

4. The portable draw arc stud welder apparatus as set forth in claim 1, wherein the SWBCS is further configured to activate the one of more fans from a first speed to a second speed faster than the first speed, if either a measured weld frequency exceeds a predetermined weld frequency level, or a measured LFP battery temperature rate of change exceeds a predetermined LFP battery temperature rate of change level, or if the measured average power of the LFP battery exceeds a predetermined average power level of the LFP battery and the measured temperature of LFP battery 38 exceeds a predetermined temperature of the LFP battery.

5. The portable draw arc stud welder apparatus as set forth in claim 4, wherein the activation of the one or more fans includes a variable speed relative to at least one of the predetermined weld frequency level, the predetermined LFP battery temperature rate of change level, the predetermined average power level of the LFP battery, and the predetermined temperature of the LFP battery.

6. The portable draw arc stud welder apparatus as set forth in claim 1, wherein the SWBCS is further configured to activate the one of more fans from a first speed to a second speed slower than the first speed, if either a measured weld frequency is below a predetermined weld frequency level, and a measured battery temperature rate of change is below a predetermined temperature rate of change level, and if a measured average power from LFP battery is below a predetermined average power level and a measured temperature of LFP battery is below the predetermined temperature of LFP battery.

7. The portable draw arc stud welder apparatus as set forth in claim 6, wherein the activation of the one or more fans includes a variable speed relative to at least one of the predetermined weld frequency level, the predetermined temperature rate of change level, the predetermined average power level, and the predetermined temperature of LFP battery.

8. The portable draw arc stud welder apparatus as set forth in claim 1 wherein the SWBCS is further configured to deactivate the one or more fans if either a measured weld frequency is below a predetermined weld frequency level, and a measured battery temperature rate of change is below a predetermined temperature rate of change level, and if a measured average power of the LFP battery is below a predetermined average power level and a measured temperature of the LFP battery is below a predetermined temperature of the LFP battery.

9. The portable draw arc stud welder apparatus as set forth in claim 8, wherein the deactivation of the one or more fans includes a variable speed relative to at least one of the predetermined weld frequency level, the predetermined temperature rate of change level, the predetermined average power level and the predetermined temperature of the LFP battery.

10. The portable drawn arc stud welder apparatus as set forth in claim 1 wherein the SWBCS is further configured to generate a battery low error signal when a measured rate of change of the voltage of the LFP battery exceeds a predetermined level.

11. The portable drawn arc stud welder apparatus as set forth in claim 10 wherein the SWBCS is further configured to generate a battery low error signal when the SWBCS determines that a difference between a predetermined weld current setpoint and a measured weld current exceeds a predetermined weld current value.

12. The portable drawn arc stud welder apparatus as set forth in claim 11, wherein the SWBCS is further configured to generate a low battery error signal when the SWBCS measures the voltage of the LFP battery and determines whether the measured voltage of the LFP battery is below a predetermined voltage value.

13. The portable drawn arc stud welder apparatus as set forth in claim 12, wherein the SWBCS determines a state of charge of the LFP battery by measuring the voltage of the LFP battery and comparing it to a predetermined LFP battery voltage level.

14. The portable drawn arc stud welder apparatus as set forth in claim 13, wherein the SWBCS is configured to measure a charging current of the LFP battery and determines if the measured charging current of the LFP battery is above a predetermined charging current level of the LFP battery.

15. The portable drawn arc stud welder apparatus as set forth in claim 1, wherein the LFP battery includes:
a plurality of battery cells electrically connected to a plurality of battery cell busbars for the transmission of electrical energy to and/or from the plurality of battery cells;
a plurality of battery terminal busbars electrically connected to the plurality of battery cell busbars for the transmission of electrical energy to and/or from the LFP battery;
a plurality of thermally conductive, electrically insulating pads disposed between the plurality of battery cells;
a housing of the LFP battery wherein at least a portion of the housing is configured as a heat sink;
a plurality of temperature sensors disposed about the housing of the LFP battery; and at least one cooling duct disposed in the LFP battery and in fluid communication with the at least one or more fans.

16. The portable drawn arc stud welder apparatus as set forth in claim 1, wherein the SWBCS is configured to measure a voltage of each of the plurality of battery cells of the LFP battery to determine if the voltages of each of the plurality of battery cells of the LFP battery is within a predetermined voltage range.

17. The portable drawn arc stud welder apparatus as set forth in claim 16, wherein the SWBCS is configured to compare the measured voltages of the plurality of battery cells of the LFP battery to a predetermined voltage range of the plurality of battery cells to deter the LFP battery mine if any of the plurality of battery cells of the LFP battery has a measured voltage above and/or below the predetermined voltage range.

18. The portable drawn arc stud welder apparatus as set forth in claim 17, wherein the SWBCS is configured to balance the charge levels of the plurality of battery cells of the LFP battery to the predetermined voltage range if any of the plurality of battery cells of the LFP battery has a measured voltage above and/or below the predetermined voltage range.

19. The portable drawn arc stud welder apparatus as set forth in claim 1, wherein the SWBCS is configured to determine whether the measured voltage level is within a predetermined voltage range and charges the weld stud gun coil capacitor if the measured voltage level is below the predetermined voltage level and wherein the SWBCS is configured to allow a weld process to proceed after the SWBCS determines whether any errors are detected and/or measurements are in non-compliance with at least one of the predetermined levels and/or predetermined ranges.

* * * * *